(12) United States Patent
Beshai

(10) Patent No.: US 7,061,910 B2
(45) Date of Patent: Jun. 13, 2006

(54) UNIVERSAL TRANSFER METHOD AND NETWORK WITH DISTRIBUTED SWITCH

(75) Inventor: Maged E. Beshai, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 1104 days.

(21) Appl. No.: 10/022,403

(22) Filed: Dec. 20, 2001

(65) Prior Publication Data

US 2002/0080790 A1   Jun. 27, 2002

Related U.S. Application Data

(62) Division of application No. 09/132,465, filed on Aug. 11, 1998, now Pat. No. 6,356,546.

(51) Int. Cl.
*H04L 12/28* (2006.01)
*H04L 12/56* (2006.01)

(52) U.S. Cl. .................. 370/392; 370/312; 370/349; 370/354; 370/389; 370/360; 370/437

(58) Field of Classification Search .................. None
See application file for complete search history.

(56) References Cited

U.S. PATENT DOCUMENTS 5,229,993 A    7/1993 Foudriat et al.
5,444,849 A *  8/1995 Farrand et al. ............. 709/237
5,550,820 A *  8/1996 Baran ....................... 370/395.5
5,894,481 A *  4/1999 Book .......................... 370/412
5,930,257 A *  7/1999 Smith et al. ................ 370/401

FOREIGN PATENT DOCUMENTS

| EP | 0 492 852 A2 | 7/1992 |
| EP | 0 841 781 A | 5/1998 |
| EP | 0 841 781 A2 | 5/1998 |
| WO | 97/01940 | 1/1997 |
| WO | WO 97 01940 A | 1/1997 |

* cited by examiner

*Primary Examiner*—Wellington Chin
*Assistant Examiner*—Raj Jain

(57) ABSTRACT

A method and a network for a universal transfer mode (UTM) of transferring data packets at a regulated rate are disclosed. The method defines a protocol that uses an adaptive packet header simplify packet routing and increase transfer speed. The protocol supports a plurality of data formats, such as PCM voice data, IP packets, ATM cells, frame relay and the like. The network preferably includes plurality of modules that provide interfaces to various data sources. The modules are interconnected by an optic core with adequate inter-module links with preferably no more than two hops being required between any origination/destination pair of modules. The adaptive packet header is used for both signaling and payload transfer.

15 Claims, 29 Drawing Sheets

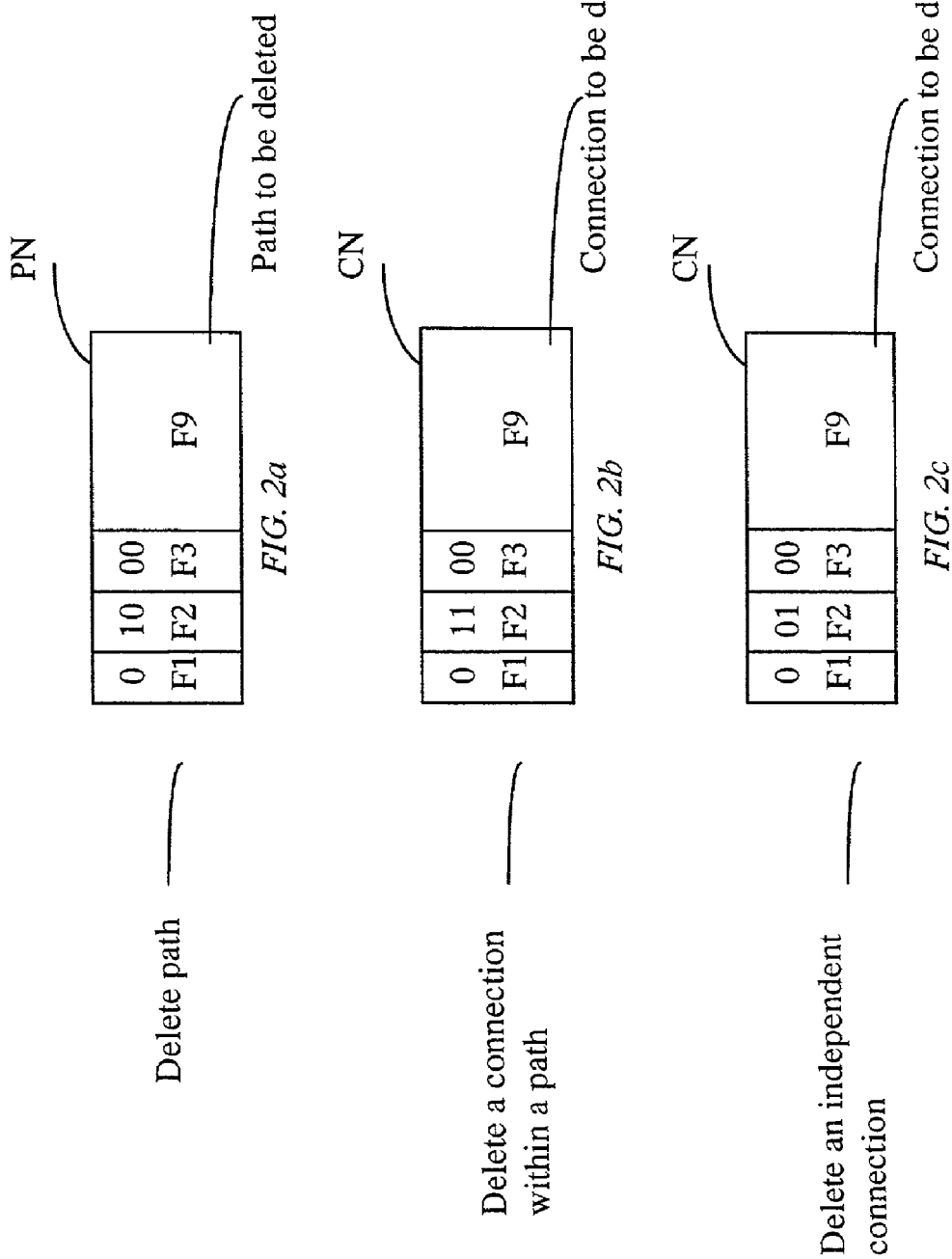

| From node #2 to node # | Report uncommitted capacity to: | | | |
|---|---|---|---|---|
| | node # | node # | node # | node # |
| 0 | 1 | 3 | 4 | |
| 1 | 0 | 3 | 4 | |
| 2 | | | | |
| 3 | 0 | 1 | 5 | |
| 4 | 1 | 3 | | |
| 5 | 1 | 3 | | |

210

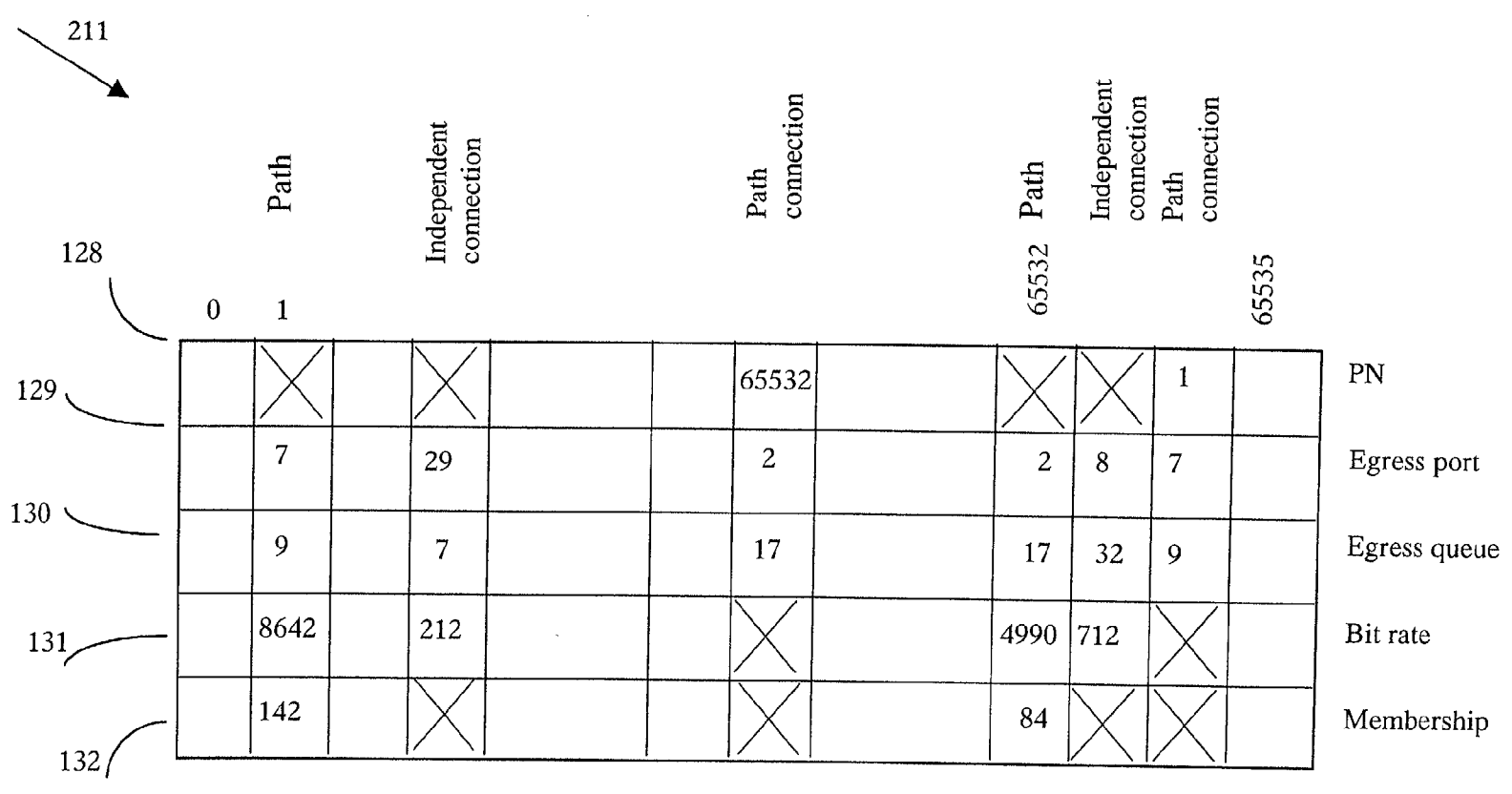

| | PN | Egress port | Egress queue | Bit rate | Membership | |
|---|---|---|---|---|---|---|
| 0 | | | | | | |
| 1 | X | 7 | 9 | 8642 | 142 | Path |
| | X | 29 | 7 | 212 | X | Independent connection |
| | | | | | | |
| 65532 | 65532 | 2 | 17 | X | X | Path connection |
| | X | 2 | 17 | 4990 | 84 | Path |
| | X | 8 | 32 | 712 | X | Independent connection |
| | 1 | 7 | 9 | X | X | Path connection |
| 65535 | | | | | | |

FIG. 19

| | Allocations | Carry-forward | Credits | Waiting: count & size | | Transfer: number & size | | Carry-over |
|---|---|---|---|---|---|---|---|---|
| 0 | 40 | 40 | 80 | 1 | 78 | 1 | 78 | 0 |
| 1 | 80 | 00 | 80 | 1 | 122 | 0 | 0 | 80 |
| 2 | 186 | 186 | 372 | 2 | 620 | 1 | 320 | 52 |
| 3 | 120 | 120 | 240 | 2 | 264 | 1 | 160 | 80 |
| 4 | 78 | 00 | 78 | 0 | 0 | 0 | 0 | 0 |
| 5 | 52 | 00 | 52 | 0 | 0 | 0 | 0 | 0 |
| 6 | 288 | 00 | 288 | 5 | 470 | 4 | 280 | 8 |
| 7 | 42 | 00 | 42 | 0 | 0 | 0 | 0 | 0 |
| 8 | 112 | 112 | 224 | 1 | 292 | 0 | 0 | 224 |

991

170 — Allocations
172 — Carry-forward
174 — Credits
176 — Waiting: count & size
178 — Transfer: number & size
180 — Carry-over

| Current zone | Stream buffer occupancy change | |
|---|---|---|
| | Positive or zero | Negative |
| 2 | +Δ1 | 0 |
| 1 | 0 | 0 |
| 0 | 0 | −Δ2 |

1400

UNIVERSAL TRANSFER METHOD AND NETWORK WITH DISTRIBUTED SWITCH

This is a division of application Ser. No. 09/132,465, filed Aug. 11, 1998, now U.S. Pat. No. 6,356,546.

TECHNICAL FIELD

This invention relates to the transfer of data between two points and, in particular, to a Universal Transfer Mode of transferring data from a plurality of sources that may operate under different communications protocols to a plurality of sinks using switch modules interconnected by a passive core.

BACKGROUND OF THE INVENTION

Modern telecommunications services are supported by a plurality of networks. The various networks operate under protocols that use packets of various lengths and formats to transfer data between a source and a sink. Modern telecommunications services provide the capability for business and social communications between geographically separated parties. This capability has stimulated a demand for such services and placed a burden on the capacity of existing infrastructure.

In order to increase the capacity for information exchange using the existing infrastructure, there has developed an interest in using asynchronous network facilities such as Asynchronous Transfer Mode (ATM) networks as backbone transport for voice and voice data as well as broadband services. Asynchronous network facilities are preferred for backbone transport because they permit more efficient use of network resources than synchronous transfer mode (STM) facilities. Network cost is therefore reduced. The ATM protocol uses a fixed cell length of 53 bytes. Consequently, packets originating in a network that operates under a different protocol must be deconstructed and packed in ATM cells before they can be transferred through the ATM network. After the packets are transferred through the ATM network, they must be unpacked from the cells and reconstructed before the cells are delivered to a sink. This is a time consuming task that can impact service delivery and quality of service.

Some telecommunications protocols such as Internet Protocol (IP) support packets of variable length. IP is unsuitable for certain telecommunications services, however, because it is connectionless and offers no guaranteed quality-of service. Recent work has been done to develop protocols for providing quality of service in IP networks. Resource Reservation Protocol (RSVP) is, for example, one result of such work. Even if quality of service is successfully implemented in IP networks, however, packet addressing and routing in such networks is too processing intensive to permit a high-speed multi-service scalable network to be implemented.

As the demand for telecommunications services increases, service providers seek cost effective methods of service delivery. One way to provide cost effective service delivery is to provide a backbone transport network that is capable of supporting a variety of narrow-band and broad-band services so that network provisioning and management costs are shared by a large and diverse user base. Ideally, such a backbone transport network is adapted to support many different telecommunications services and both connection-based and connectionless protocols. To date, no such network is known to have been proposed or described.

SUMMARY OF THE INVENTION

It is therefore an object of the invention to provide a Universal Transfer Mode (UTM) protocol for transferring telecommunications data in packets from a plurality of sources which may operate under different protocols to a plurality of sinks.

It is a further object of the invention to provide a network specifically adapted to operate under the UTM protocol.

It is yet a further object of the invention to provide a protocol and a network which are adapted to transfer packets of substantially any length without packet fragmentation.

It is yet a further object of the invention to provide a protocol and a network which are adapted to transfer both connectionless and connection-based data traffic.

It is another object of the invention to provide a protocol and a network which are adapted to enable rate regulated data packet transfer in a multi-class data network.

It is yet a further object of the invention to provide a protocol that uses an adaptive header for both control signaling and for payload transfer.

It is yet a further object of the invention to provide a UTM protocol in which the adaptive header is used as a control packet for setting up or tearing down a path, a connection within a path or an independent connection with the UTM network.

It is yet a further object of the invention to provide a UTM protocol in which the adaptive header is parsed by a simple algorithm to determine a function of the header and a destination for packets appended to the header.

It is yet another object of the invention to support the optional subdivision of data in a connection-based data packet into sub-fields to support multi-type communications.

In its simplest aspect, a protocol for data transfer in a data network that transfers variable length payload data packets comprising:

an adaptive header that is parsed to interpret a purpose and a destination for each packet transferred within the data network, the payload packets being appended to the adaptive header to effect the transfer of the payload packets through the data network, and the adaptive header being used alone as a control packet for control messages exchanged in the data network.

The invention further provides a UTM distributed switch, comprising a plurality of modules, each module interfacing with a plurality of links, the modules accepting data to be routed through universal ports which transfer packets of variable size to others of the plurality of modules; a passive core that logically interconnects each of the modules to each of the other modules and transfers the data between the modules under control of the modules; the traffic between any source and a sink being rate regulated.

The invention also provides a method of transferring telecommunications data in packets from a plurality of sources to a plurality of sinks comprising the steps of accepting a communications admission request from a source at an interface at a module port that operates under a universal transfer mode (UTM) protocol, the communications admission request providing communications admission control parameters required for establishing a communications session between the source and a sink; for a connection-oriented transaction, setting up a connection for the communications session through the UTM network; accepting the packets from the source at the interface and determining a length of each packet; and transferring the packet to an interface that serves the sink using the connection or destination identifier.

The UTM protocol and the UTM network in accordance with the invention provide rate regulated data transfer between a source and a sink. Both connectionless and connection-based traffic may be served. The UTM protocol accommodates a plurality of classes of service, which ensure a quality of service appropriate to the data being transferred. Transfer through the UTM network is accomplished using an adaptive UTM header that is parsed by UTM modules using a simple algorithm that is preferably implemented in hardware. The algorithm determines a purpose and a destination of each packet transferred through the UTM network.

The adaptive UTM header is also used for control signaling in the UTM network. When used for control signaling, the adaptive header of a UTM control packet is transferred through the network as required to set up or take down a path, a connection within a path or an independent connection. Independent connections are preferably used in the UTM network only for high bit rate connections. For low bit rate connections, the preferred method of transfer is a connection within a path. Once a path is established between two modules in the UTM network, it can support as many connections as the capacity of the path permits. In setting up a connection within a path, only the originating module needs to deal with resource allocation and resource usage tracking. This significantly improves the connection setup rate in the UTM network.

The UTM network preferably comprises a plurality of edge modules switch that are interconnected by a passive core. The core is preferably optical and includes optical cross-connects. In the preferred embodiment, the passive core provides a high connectivity. Preferably, not more than two hops are required to establish a connection between any two modules. The edge modules include universal ports connected to the optical core and ingress/egress ports connected to various service networks. Ingress ports accept data packets from a source and append them to an adaptive header. The adaptive header indicates a destination for the packet, which is used to route the packet across the module, and through the passive core. At a destination module, the adaptive header is removed from the packet and the packet is transferred to a sink in its native format. Thus, packets of any supported format may be transferred through the UTM network without fragmentation. Consequently, the complications associated with the deconstruction and reconstruction of packets are avoided.

Traffic in the UTM network is rate regulated from end to end. Rate regulation is accomplished using a control element associated with each module and a packet scheduler associated with each egress link controller in each module. The control element handles traffic admission requests and assigns a rate allocation to each connection. The packet scheduler handles packet transfer in accordance with the rate allocations. Packet scheduling is facilitated by sorting payload packets by destination and by class of service. Parallel adders are used in the packet scheduler to ensure that packets are transferred at link speed so that the full capacity of the UTM network is available for packet transfer.

Connectionless traffic is served by inserting a destination in the adaptive header appended to a connectionless packet. When the network is busy, connectionless traffic uses free time intervals. If the full capacity of the network is not being used, the connectionless traffic is preferably allocated a connection and assigned a connection number that permits the connectionless packets to be transferred more efficiently through the network. When the connection allocated to the connectionless traffic is required by connection-based traffic, the connection allocated to the connectionless traffic is revoked, or its allocated bit rate is reduced, and the connectionless traffic reverts to being forwarded in unoccupied packet time intervals.

Another important feature of the UTM protocol is the optional subdivision of the data field of a connection-based data packet into sub-fields to support multi-type communications commonly referred to as "multi-media" communications. For example, a keen interest exists in the capacity to transmit sound and video simultaneously in a data packet to support live video. Some applications may also require the transfer of text with live video. For example, educational lectures commonly consist of voice, video and text presentations. The adaptive header in accordance with the invention supports the transfer of packets that include predefined sub-fields to support such services.

BRIEF DESCRIPTION OF THE DRAWINGS

The invention will now be further explained by way of example only and with reference to the following drawings, wherein:

FIGS. 1a–c are schematic diagrams of examples of control signaling packets using the adaptive packet header in accordance with the invention, wherein FIG. 1a shows a path creation packet, FIG. 1b shows a connection within a path creation packet, and FIG. 1c shows an independent connection creation packet;

FIGS. 2a–c are schematic diagrams of examples of control signaling packets using the adaptive packet header in accordance with the invention, wherein FIG. 2a shows a path deletion packet, FIG. 2b shows a connection within a path deletion packet, and FIG. 2c shows an independent connection deletion packet;

FIGS. 3a–b are schematic diagrams of examples of data packets for connection-based packet transfer, wherein FIG. 3a shows a packet for transferring a normal packet in known format and FIG. 3b is a packet for transferring multi-data type;

FIG. 19 is a schematic diagram of an ingress port control table used in UTM modules to track communication sessions and paths and connections to support those sessions;

FIG. 22 is a schematic diagram of arrays computed by the egress selector shown in FIG. 21;

DETAILED DESCRIPTION OF THE PREFERRED EMBODIMENTS

Definitions

Figures 1A, 1B, 1C:
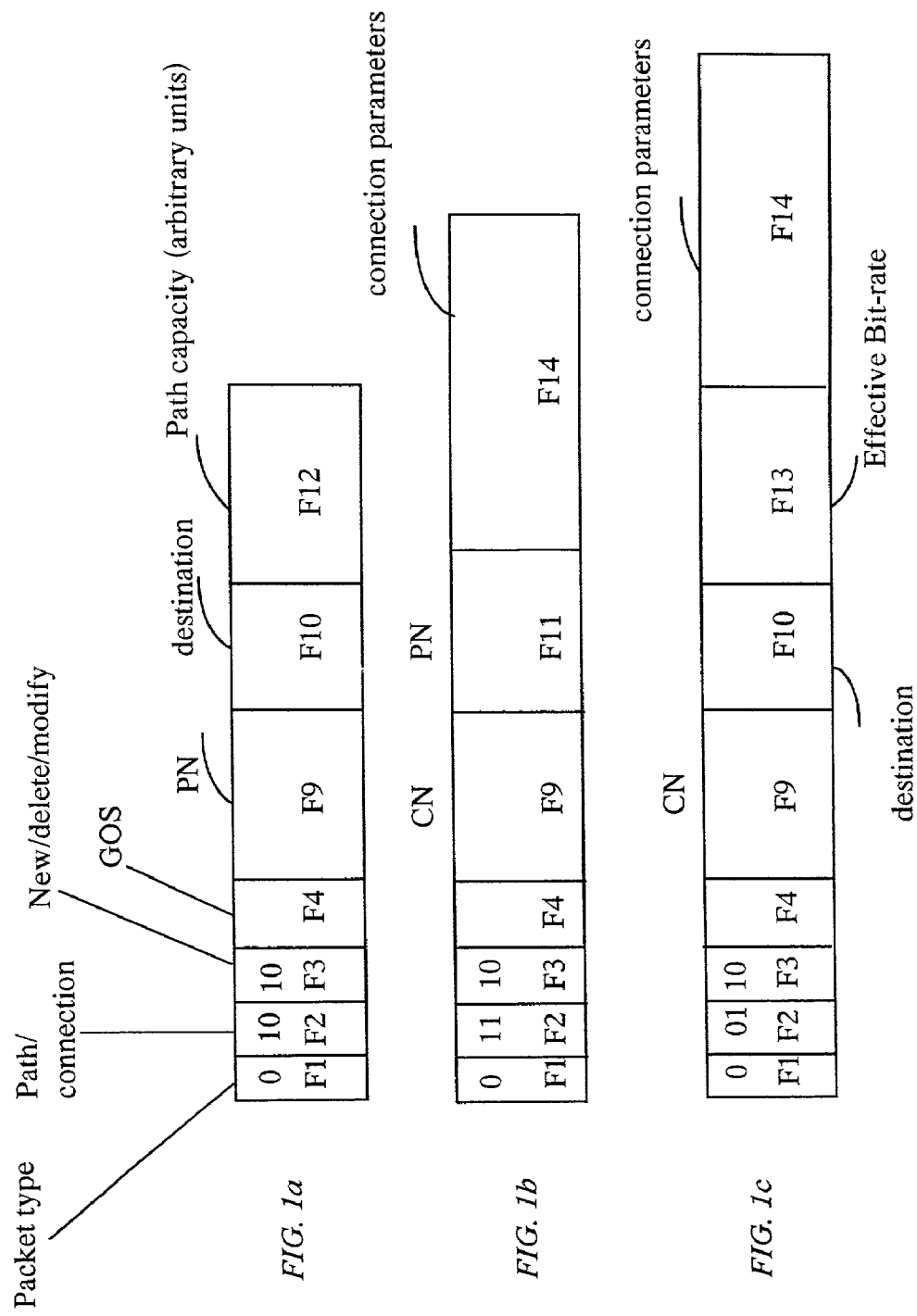

In this document, the terms 'distributed switch' and 'network' are used interchangeably. A distributed switch as used herein is a network of distributed switch modules which collectively demonstrate the behavior of a single switch. The terms 'module' and 'node' are also used interchangeably.

A path means a route of specified capacity reserved between a source module and a sink module. A path may accommodate a number of connections, hereinafter referred to as connections within a path, as well as connectionless traffic. The path is preserved even though connections are created or deleted within the path.

An independent connection is established in response to a connection admission request and is dedicated to traffic associated with that request.

A traffic source in the UTM network is a device that generates data, and a traffic sink is a device that receives data. A traffic source or a traffic sink must, however, be capable of both transmitting and receiving control signals. In the route setup context, a module supporting the source is called a source module and a module supporting the sink is called a sink module. A module may support both the source and the sink of the same path or connection.

A routing request message is a UTM control packet requesting a setup of either a path or an independent connection in the UTM network between a source module and a sink module.

Connection-based traffic streams with unspecified transfer rates and connectionless traffic streams provided with provisional connections for transfer through the UTM network are called unregulated traffic streams.

Introduction

The invention relates to a Universal Transfer Mode protocol and network to support data packet communications. The protocol may be used in any network designed to switch variable sized packets and is not limited to use in the specific UTM network described below. In a preferred embodiment of the network, a distributed switching architecture is used. To switching modules in this architecture, the entire network appears as a single switch. This is due to the protocol which uses an adaptive packet header to route packets through the network using a simple numeric field for routing control, and due to a highly-connected network core.

The protocol and the network are referred to as a "universal transfer mode" (UTM) protocol and network because they offer variable-size packet transfer with grade-of-service (GOS) and quality-of-service (QOS) specifications. The protocol and the network core are collectively adapted to transfer data from a plurality of sources that may use different protocols and different packet structures. For example, a UTM network can be used to transfer PCM voice data, IP packets, frame relay data, or ATM cells. None of the packets or cells transferred through the UTM network is fragmented. The packets or cells are accepted by a UTM module in their native format and an adaptive header is appended to each. After transfer through the network, the adaptive header is removed and the packet or cell is passed to a sink in the format in which it was received from the source. This eliminates practically all pre-transfer and post transfer processing and greatly facilitates data transfer.

If a UTM network in accordance with the invention is constructed with a passive optical core that uses optical cross-connects for channel switching, very large data transfer rates may be achieved. It is possible to build such a network with known technology that has a capacity to switch several hundred terabits per second.

The UTM protocol, a UTM network and a method and apparatus for routing and rate regulation for data transfer will be explained in the description that follows.

UTM Protocol

The UTM protocol supports both connectionless and connection-based communications. The protocol is used to transfer data packets or cells from a plurality of sources that respectively use a plurality of different protocols and different packet or cell structures. Hereinafter, the word "packet" is used to refer to any data to be transferred through a UTM network, regardless of how the data is formatted or described in a discipline and terminology of a source network.

Packet transfer is accomplished without packet fragmentation by using an adaptive header. Each payload data packet to be transferred through the UTM network is appended to one of the adaptive headers. As well as payload transfer, the adaptive header is used for control signaling in the UTM network. The structure of the adaptive header varies according to the function it performs. A simple algorithm is used to parse each adaptive header to determine its function, as will be explained in detail below with reference to FIGS. 5a and b.

UTM packets are divided into two main types: control signaling packets, and payload data packets. Control packets are used to accomplish three principal functions: a) setting up a path, a connection within a path or an independent connection across the network; b) deleting a path, a connection within a path or an independent connection across the network; and, c) connectionless communications. A payload data packet is used for connection-based data transfer. A payload data packet normally transfers one packet from another network. A payload data packet may also carry multi-type data to support multi-media communications. In a multi-type data field, two or more types of data are grouped together in a single data packet and carried together. This permits the support of such services as real-time video with real-time audio, and the like.

The UTM protocol defines 17 fields, although normally the adaptive header portion of any UTM packet does not exceed two or three bytes. It is noted that the source identity is needed in some replies and should be appended in the control packets, though it is not shown in FIGS. 1 and 2. Table 1 summarizes the 17 fields, their length and their function:

TABLE 1

FIELDS IN A UTM DATA PACKET

| Field | Field Length | Function | Interpretation of Content |
|---|---|---|---|
| F1 | 1 bit | Packet Type | "0" indicates that the packet is either a control packet for connection-based traffic or a data packet in a "connectionless" transfer. |
| F2 | 2 bits | Path or Connection Indicator | Left digit: "0" indicates no path-1 indicates a path; Right digit: "1" indicates a connection. |
| F3 | 2 bits | Create or Delete a Path or a Connection, change a Path allocation or Reply messages | "00" deletes a path or a connection; "10" creates a path or a connection; "01" changes a path allocation; "11" indicates a reply message. For a reply message, the reply information follows F3. |
| F4 | 3 bits | Grade of Service Index | An integer between 0 and 7, for example, which includes a GOS preference for admission to the UTM network. |
| F5 | 3 bits | QOS Index | An integer between 0 and 7, for example, which indicates a QOS preference for a connectionless communication session. |
| F6 | 2 bytes | Destination | Numeric code that identifies a destination module for a connectionless packet. |

TABLE 1-continued

FIELDS IN A UTM DATA PACKET

| Field | Field Length | Function | Interpretation of Content |
|---|---|---|---|
| F7 | 12 bits | Length (bytes) | Length in bytes of data in a connectionless packet, 4–4096 bytes. |
| F8 | 1–4096 bytes | Connectionless Payload | Payload of a connectionless packet. |
| F9 | 16 bits | NEW Path or Connection Number | Path number if the right digit of F2 is zero and, otherwise, a connection number. |
| F10 | 16 bits | Destination | Destination of a path or an independent connection. |
| F11 | 16 bits | Path number | Path number of a dependent connection (a connection within a path). |
| F12 | 20 bits | Capacity in Predefined units, e.g. kilobits/sec | Capacity required for a new path-determined by an originating module. |
| F13 | 20 bits | Equivalent Bit Rate parameters | The equivalent bit rate for an independent connection is computed by the originating module and two parameters are passed to downstream modules to permit each downstream module to rapidly compute an equivalent bit rate, to speed up call setup. |
| F14 | 24 bits | Connection Parameters | Passed through the UTM network to a sink to permit the sink to determine whether the connection admission request can be accommodated. F14 may also be used to pass the lengths of multi-type data to the sink. |
| F15 | 16 bits | Existing Connection Number | Only the connection number is carried in data packets in a connection-based communication. The associated path number, if any, is stored at intermediate modules. |
| F16 | 14 bits | Data packet length | If a packet belonging to a given connection has only one data type, then only the data size, in bytes say, need be known. If the data is partitioned into several types (e.g., voice, video, and text) then information about the division of the packets data load needs to be passed to the sink. The first 12 bits of F16 indicate the data size, and the last two bits indicate the number of data types in a multi-part data packet. |
| F17 | 1–4096 bytes | Connection-based payload | The payload data of a packet belonging to a connection within a path or an independent connection. If the last two bits of F16 are "00", then F17 carries one data type. Otherwise, the two bits indicate the number of data types, the length of each being specified at the beginning of F17. |

The 17 fields of an UTM data packet are hereinafter referred to as F1, F2, . . . F17. It will be understood that the list in Table 1 is not necessarily exhaustive of the fields required for UTM control messaging. Other fields may be required for certain implementations. Control messaging is a standard part of any protocol that is well understood by persons skilled in the art and is therefore not discussed in detail in the description that follows.

Field F1 is only one bit and it determines whether the packet is a control packet (including a connectionless-mode packet) or a data packet.

Field F2 is two bits wide. It is used in control packets to indicate the type of connection that should be created for a traffic admission request or deleted when a data communications session terminates. A value of "1" in the left-hand bit indicates that a path is to be created or deleted, or that a connection to be created or deleted belongs to an already established path. A value of "1" in the right-hand bit indicates that the control packet is to establish or delete a connection within a path or an independent connection. If both bits are set to "0", the packet belongs to a connectionless data traffic stream.

Field F3 is two bits wide and is used for control functions. A value of "10" or "00" indicates whether a control packet is used for a create or a delete function. The create function ("10") sets up a path or a connection, whereas the delete function ("00") tears down an existing path or connection. A value of "01" indicates that the capacity of an existing path is to be changed. The change may be an increase or a decrease in the capacity of the path. The identity of the path to be changed is stored in F9 and the new capacity is stored in F12. The value in F12 may be larger than the previous path capacity or smaller than the previous path capacity. A request for a path change to decrease path capacity is always granted. A request to increase path capacity must be approved by all modules which a path traverses. When an egress controller traversed by a path receives a request to increase the capacity of the path, the egress controller checks an available capacity pool for the egress link it controls to determine if enough available capacity exists to grant the request. If there is adequate capacity in the link resource pool, the controller approves the increase in path capacity. If all egress controllers in a path approve the increase, the capacity of the path is changed. If the value of F3 is "11", the adaptive header is used for replying to a control message. The reply message may be an acknowledgement or a reply for various purposes well understood in the art. In reply messages, the reply parameters may be appended directly after F3. The structure of reply messages is a matter of design choice. The source identity is of course needed in a reply message. The source identity is not shown in the control packets of FIGS. 1 to 4.

Field F4 specifies a "Grade of Service" (GOS) for the set-up of a connection or a path in the UTM network. The GOS is a metric usually expressed in terms of setup delay and blocking. GOS can be realized using several methods, including priority processing of connection admission requests and methods of route selection.

Field F5 follows F1 F2, and F4 in a connectionless-mode data packet. It contains the QOS index for the packet. In connectionless communications, QOS is provided on a comparative basis, since capacity allocation is not normally used. The QOS index in this case simply indicates a rank of the packet with respect to other connectionless data packets. The rank is used to determine a differential service treatment of the packet at contention points across the network. The differential weighting that controls service treatment is a matter of design choice that is controlled by service administrators. Although the preferred length of F5 is 3 bits, which provides a maximum of 8 different QOS levels, this field may be lengthened to permit more QOS control, if warranted. Field F5 follows fields F1 F2, and F4 in the adaptive header if F1 is "0" and F2 is "00".

Field F6 stores the destination of a connectionless-mode packet. The destination is a numeric code indicating a UTM destination module. The UTM destination module is determined at a UTM module ingress port or at an interface or peripheral to a UTM module ingress port by translating a called address in a connection admission request into a numeric code indicating the UTM destination module. As is well understood by those skilled in the art, the translation tables required for this operation depend on the source network and the routing discipline of that network. The procedures for maintaining such translation tables are a matter of design choice and are not the subject of this application.

Field F7 stores the data length of a connectionless-mode packet. It is used for packet delineation as the packet is routed through the UTM network. Since the UTM network transfers packets of substantially any length below a predefined maximum, it is necessary to track the length of each packet to ensure that packet fragmentation does not occur during packet transfer and that effective rate controls can be applied.

Field F8 carries the payload of a connectionless-mode packet. The maximum length of F8 is determined by the word-length of field F7. A word length of 12 bits in F7 permits a payload length of 4096 bytes. If longer packets are to be transferred, the word length of F7 may be lengthened accordingly. There is no theoretical limit on the length of packets that may be transferred.

Field F9 stores a number to be used for the set-up or deletion of a path or a connection. When the content of F3 is "10", the number stored in F9 is used to set up a path or a connection. When F3 is set to "00", the number stored in F9 is used to delete a path or a connection. F9 follows F3 in a control packet for connection-mode traffic. The interpretation of F9, i.e., whether it stores a path number or a connection number, depends on the content of F2. If F2 contains "10", then F9 denotes a path number. If F2 contains "11", then F9 denotes a connection within an existing path. If F2 contains "01", then F9 denotes an independent connection number.

Field F10 stores the numeric address of a destination module of a new path or a new independent connection. A new connection that belongs to an existing path does not require a destination field because it inherits a route allocated to the path to which it belongs.

Field F11 stores the path number of a connection within an existing path. F11 follows F9 if F2 contains "11" and F3 contains "10".

Field F12 contains the capacity requirement expressed in kilobits per second (or some other unit) of a new path. The capacity requirement is used to negotiate a new path across the UTM network. On receipt of a control packet requesting a new path, a module examines this field to determine whether adequate capacity exists to accommodate the new path. If capacity exists, the path is set up. Otherwise, the path set up is rejected.

Field F13 stores parameters used to compute an equivalent bit rate (EBR) of a new independent connection. In order to minimize the setup up time of independent connections an originating UTM module computes an EBR for the new connection using connection admission control (CAC) parameters passed to the originating module with a connection admission request. The CAC parameters include QOS specifications. Because the EBR of an independent connection varies with link capacities in a route of the connection, the EBR of an independent connection may change from module to module. Computing an EBR is computationally intensive and hence time consuming. Consequently, in addition to computing the EBR of the independent connection, the originating UTM module also computes EBR interpolation parameters that are passed to other UTM modules involved in setting up the independent connection to avoid the repetition of intensive calculations and facilitate the EBR computation. The method for computing those parameters is described in detail in applicant's co-pending patent application entitled MULTI-CLASS NETWORK, which was filed on May 1, 1998, the specification of which is incorporated herein by reference. The content of this field must be passed to downstream UTM modules, which use the parameters to compute the EBR used to determine if those UTM modules can accommodate the connection.

Field F14 is used to pass CAC parameters to a sink to permit the sink to determine whether a connection admission request can be accommodated. Since the sink cannot be assumed to be adapted to interpret the EBR parameters, F14 is used to pass the CAC parameters to the sink when a new connection is established through the UTM network.

Field F15 stores a connection number of a connection-based data-carrying packet. Data packets do not carry a path number. Only a connection number is required to route a data packet through the UTM network. A path number is not required because intermediate UTM modules, if any, and the destination UTM module store information that indicates whether a data packet belongs to an independent connection or a connection within a path, as will be explained below in detail when connection management in the UTM network is described.

Field F16 stores the data length of a connection-based data-carrying packet. Besides being used for delineation, the packet length is also used for the function of rate control in the paths and independent connections set up in the UTM network, as will be explained below in detail. The length of F16 is 14 bits. The first 12 bits indicate the length in bytes of the data in F17. The value, P, of the last two bits indicates the number of data types in a multi-type data packet. The number of data types is P+1. If P="00", the packet is a normal data packet and F17 carries data of a single type. If P="01", then F17 carries data of two types, etc. The number of multi-part data fields in a packet is arbitrarily limited to four.

Field F17 stores the data to be transferred in a connection-mode data packet. The data is an entire packet passed from a source, which may include header(s) and other control information required by a protocol under which the source network operates. The contents of the data field are immaterial to the UTM network. The only attribute of the data field that is of importance to the UTM network is the length in bytes of the data. An important feature of UTM is the optional subdivision of F17 in a connection-based data packet into sub-fields for multi-type communications. A multi-type packet is a data packet that carries several types of data, such as, voice, video, and text. For example, a multi-type connection might contain data from a voice source, a video source, and a text source, all belonging to the same communications session. Typical values of mean data rates for voice, video, and text are about 32 K b/s, 5 Mb/s, and 10 Kb/s, respectively. Consequently, on average F17 is subdivided proportionately according to the ratio of 32:5000:10. Variations in these rates over time require variable partitioning of the data field from one packet to the next.

If F17 carries multi-type data, the beginning of F17 includes P words, of 12 bits each, which store the data length of each of the first P types. When P="00", F17 stores only data. When P="11", the first three 12-bit words of F17 store the data lengths of the first three multi-part data types. The data length for the fourth multi-part data type need not be explicitly specified since the total length of F17 is given in F16. Those skilled in the art will understand that there are several simple techniques that can be used for separating the data types in F17 which are not discussed in this document.

FIGS. 1a–1c show the structure of control packets used in the creation of a path, a connection within a path and an independent connection, respectively. As is apparent, the number of fields in each control packet depends on its function. The control packet shown in FIG. 1a is used to create or change the capacity of a path and therefore contains a path number (F9), a destination (F10) and a path capacity (F12). If the control packet is intended to create a new path, the value of F3 is "10". If the control packet is intended to change the capacity of a path, the value of F3 is "01". When the capacity of a path is to be changed, the new capacity of the path is passed in F12. F4 indicates the GOS applied during path or connection setup, as will be explained below with reference to route setup procedures.

The control packet shown in FIG. 1b is used to create a connection within a path and therefore contains a new connection number (F9) and a path number (F11). No other information is required to establish the connection within the path. Resource allocation within the path is handled by the origination UTM module, which tracks path resource usage. Downstream modules in the UTM network do not require any knowledge of the allocation of path resources.

FIG. 1c shows the control packet used for the creation of an independent connection. Independent connections are preferably used only for high bit rate connections that warrant the computational effort, and hence the expense of connection setup. The control packet contains a UTM destination module address (F10) It also contains the EBR parameters and the CAC parameters as explained above with reference to fields F13 and F14.

FIGS. 2a–2c show the structure of control packets used for deleting a path, a connection within a path or an independent connection when a communications session terminates. FIG. 2a shows the control packet used for deleting a path from the UTM network. Aside from the control fields (F1–F3) used to identify the purpose of the packet, the packet contains only the number that identifies the path to be deleted. FIGS. 2b and 2c respectively show the structure of control packets used to delete a connection within a path and an independent connection. As in the control packets shown in FIG. 2a, only a connection number is specified. Since each module in a path or an independent connection maintains a record of the resources consumed by the path or the independent connection, the resources are returned to a resource pool when the path or the connection are deleted. In the case of a connection within a path, only the originating UTM module tracks resource usage. The downstream modules are advised of the deletion of a connection within a path, however, so that those modules can update a connection control table maintained to track each active connection in which an ingress port of the module is involved at any point in time. The modules also need to be advised of the deletion of the connection within a path so that the connection number can be returned to a local number pool used to track connections, as will be explained below in more detail with reference to FIGS. 17–19.

Figure 3A:
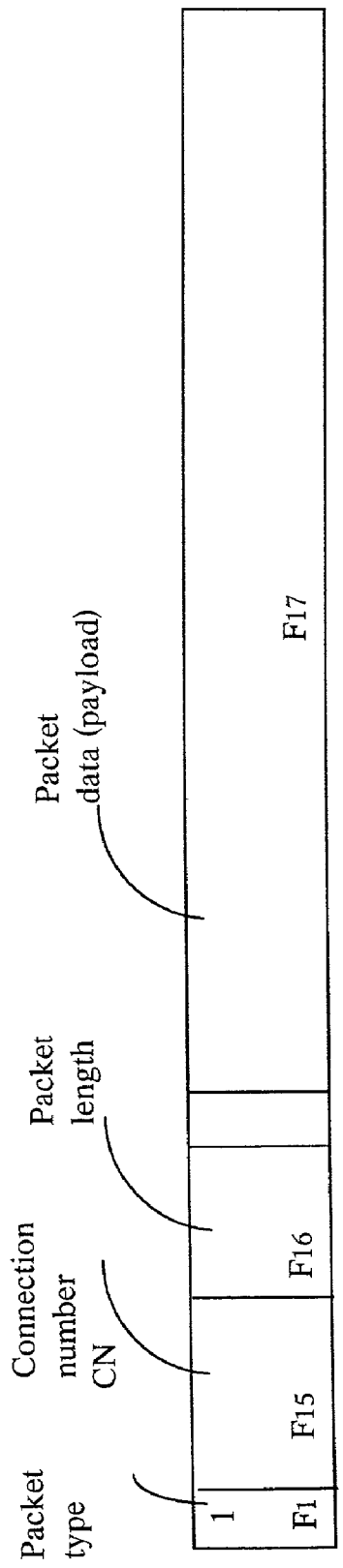
Figure 3B:
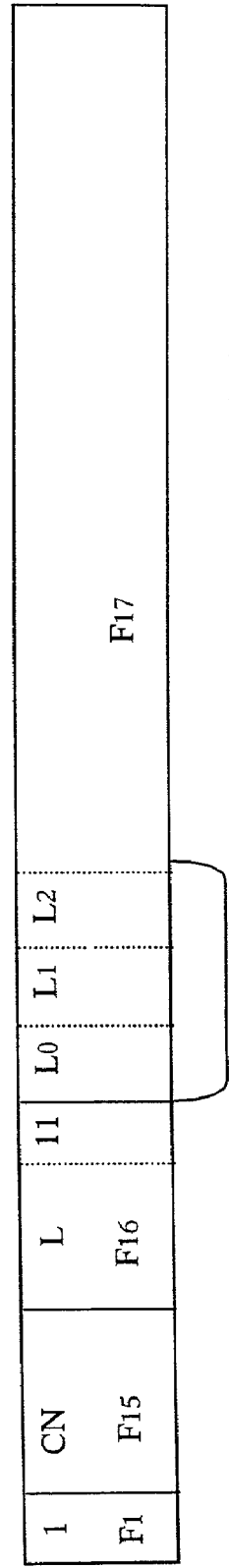

FIGS. 3a–b shows the structure of connection-based payload data packets used in the UTM protocol. As is apparent, a connection-based data packet includes only fields F1, F15, F16, and F17. Only the connection number (F15) and the packet length (F16) are used to route the data packet through the UTM network. As explained above, if a connection belongs to a path each module traversed by the path maintains information that links the connection to the path. The path information is not required in a connection-based data packet.

The connection-based packet shown in FIG. 3b is used for transferring multi-type data through the UTM network. When multi-type data is transferred, F16 contains the total length "L" of the data. Length indicators $L_1, L_2 \ldots L_{N-1}$ for the fields in the multi-type data are included in F17. The packet shown in FIG. 3 is particularly useful for transferring real-time multi-part data such as live video.

Figure 4:
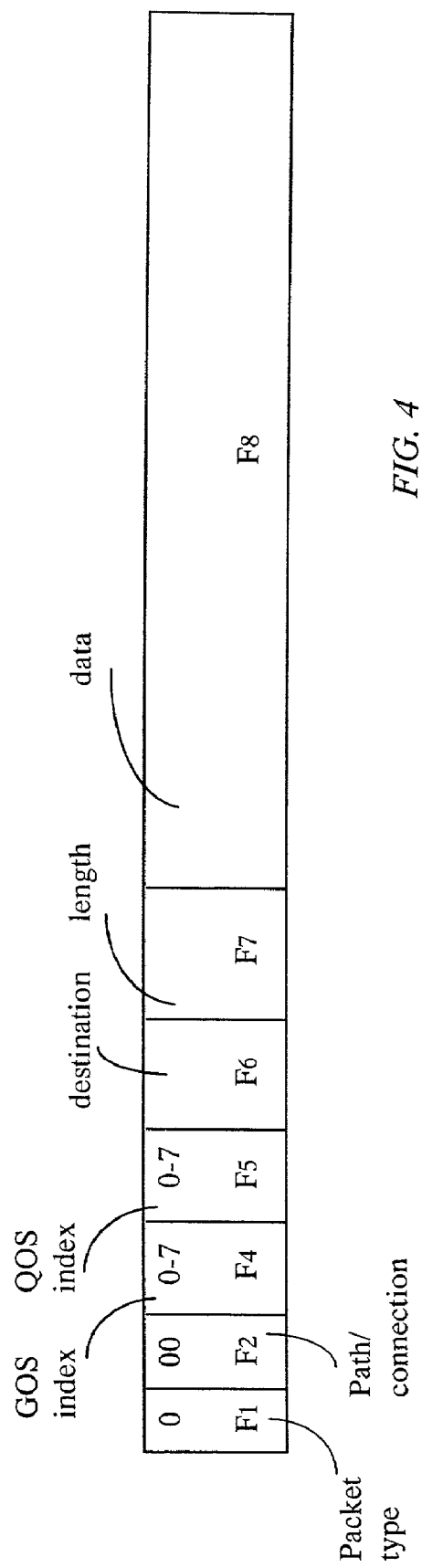
FIG. 4 is a schematic diagram of a packet used to transfer connectionless data packets through the UTM network.

FIG. 4 shows a packet structure used for the transfer of a connectionless packet from an ingress port of a UTM module which receives a connectionless packet from a source to an egress port of the module. When the connectionless packet is received at the egress port, it is sorted according to destination and class of service (determined by its QOS). The packet is preferably assigned a path or connection number when network resources permit. After the connectionless packet is assigned a path or connection number, its header is changed to a header of the type shown in FIG. 3a and the packet is transferred as a connection-based packet.

Figure 5A:
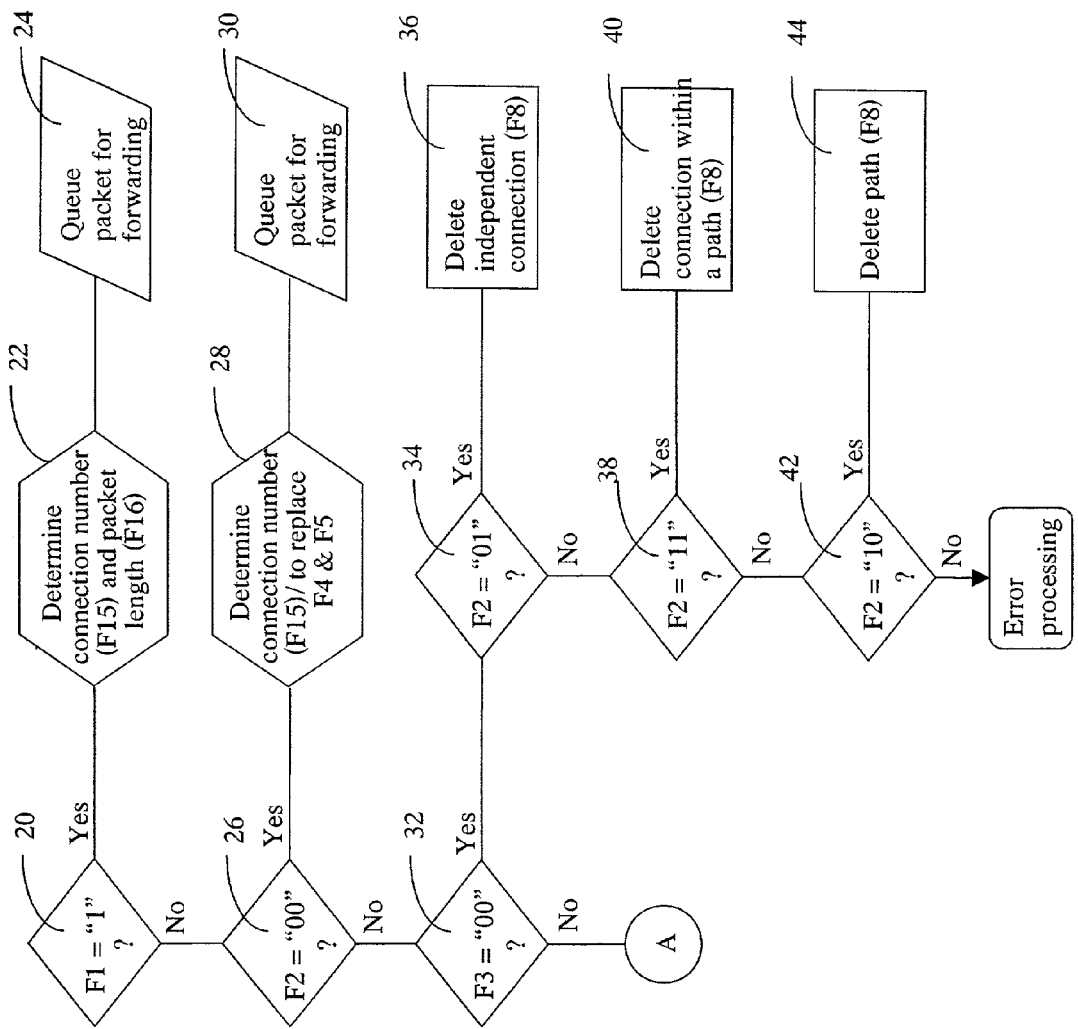
FIGS. 5a–b are flow diagrams showing an algorithm in accordance with the invention for parsing adaptive headers of UTM packets to determine an action to be taken on receipt of the packet at a UTM edge module.
Figure 5B:
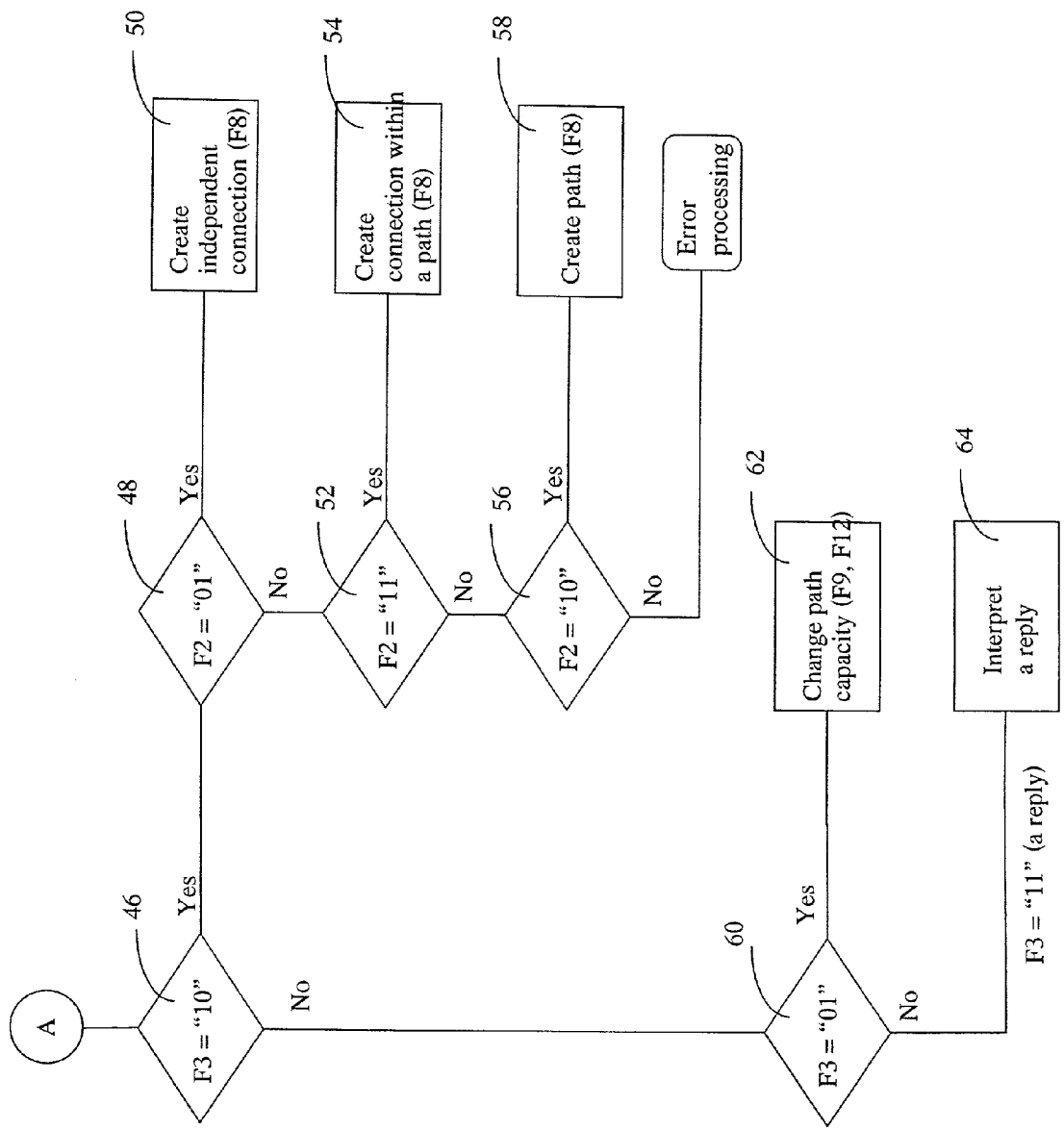

FIGS. 5a–b are a flow diagram showing the steps performed when an adaptive UTM header is parsed to determine a function of a UTM packet. The logic shown in this diagram is preferably realized in hardware, a controller chip for example, in order to ensure that the packets are parsed with minimal delay. The algorithm may, alternatively, be embodied in a simple software program executed by the ingress/egress controller cards.

As shown in FIG. 5a, in step 20 F1 is tested to determine its value. If F1="1", the packet is a connection-based data packet and in step 22, F16 and F17 are parsed to determine a connection number and a length of the packet. A data packet pointer record containing this information is written in step 24, and the data packet pointer record is placed in a queue for forwarding the packet in a manner to be described below with reference to FIGS. 17–19. If it is determined in step 20 that F1="0", the value of F2 is tested in step 26. If F2="00", the packet is a connectionless data packet. In accordance with the invention, connectionless traffic is preferably transferred through the UTM network as connection-based traffic. Consequently, in step 28 the fields F4 and F5 are replaced with a connection number placed in field F14 and a data packet pointer record is created in step 30. If F2 does not contain "00", the content of F3 is tested in step 32. If F3="00", the packet is a control packet for a delete function. The value of F2 is therefore tested in one or more of steps 34, 38, 42 and depending on the value of F2, an independent connection is deleted (step 36), a connection within a path is deleted (step 40) or a path is deleted (step 44).

If F3 is not equal to "00", the process moves to step 46 (FIG. 5b) where the value of F3 is tested again. If F3="10", the value of F2 is tested (one or more of steps 48, 52, 56) to determine whether an independent connection is to be created (step 50), a connection within a path is to be created (step 54), or a path is to be created (step 58).

If it is determined in step 46 that F3 is not equal to "10", the value of F3 is determined in step 60. If F3="01" the capacity of a path identified by the contents of F9 is changed to a bit rate specified in F12. The capacity of a path may be increased or decreased in this way. Dynamic control of path capacity is an important feature of the UTM protocol, which permits a significant degree of control over the use of network resources.

If the value of F3 is determined in step 60 to be equal to "11", the packet is a control packet used for a response function and response function analysis is performed in step 64, in a manner well understood in the art.

UTM Network Architecture

Figure 6:
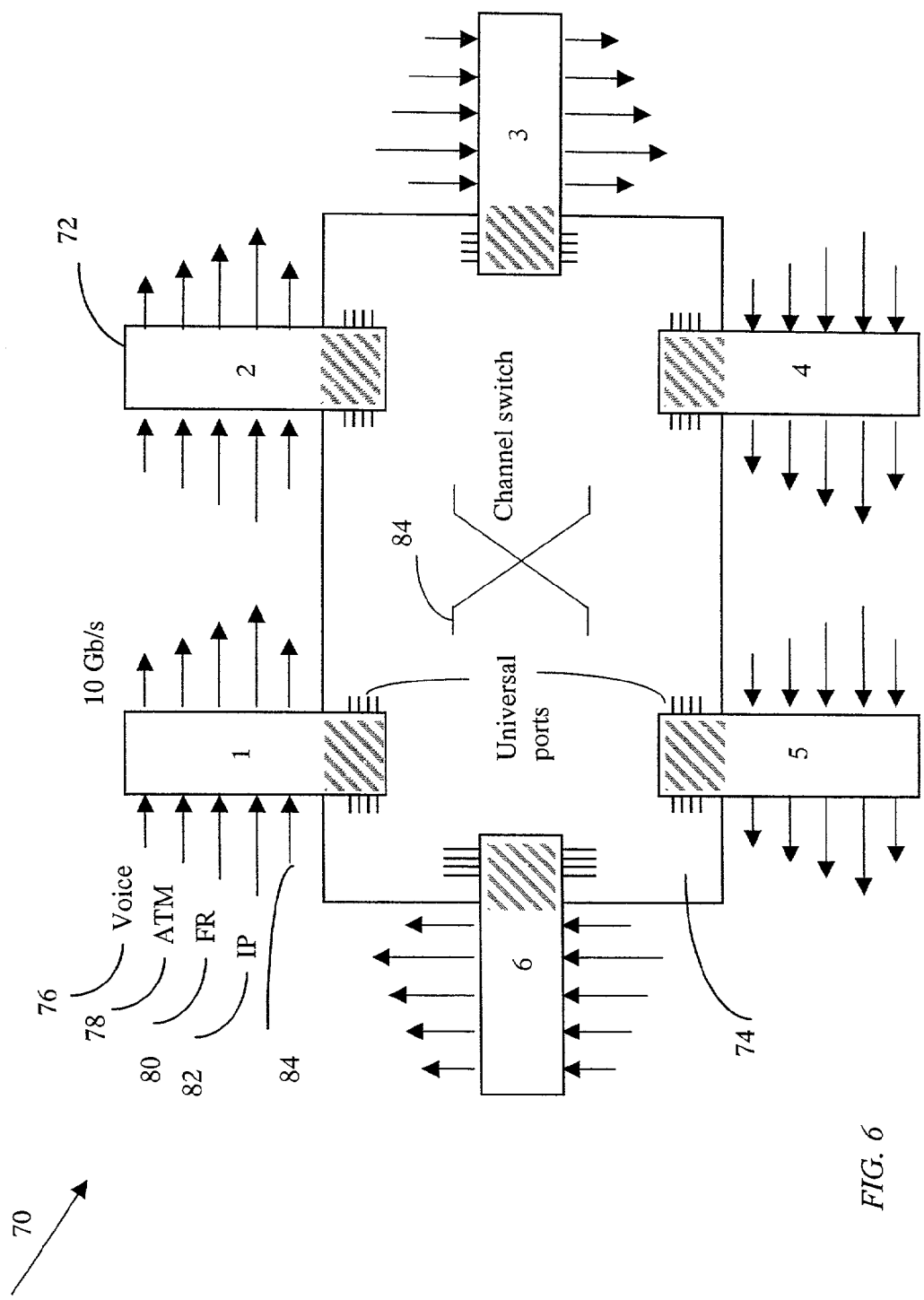
FIG. 6 is a schematic diagram of a preferred architecture for a UTM network in accordance with the invention.

FIG. 6 is a schematic diagram of a preferred architecture of a UTM network in accordance with the invention, generally indicated by the reference 70. The UTM network 70 includes a plurality of switch modules 72, hereinafter referred too simply as "modules 72". The modules 72 include a plurality of ports 76, 78, 80 and 82 that accept data from sources. The sources are, for example, STM networks from which voice and voice grade data are accepted at ports 76; ATM networks from which ATM cells are accepted at ports 78; Frame relay networks from which frame relay data is accepted at ports 80; IP networks from which IP packets are accepted at ports 82. Packets in UTM format may also be received at ports 84 from other modules 72 in the UTM network 70, as well as from other UTM sources which may include, for example, virtual private corporate networks or the like that exchange data using the UTM protocol.

The modules 72 are modular switches that consist of a plurality of ingress/egress controllers 87, 88 (FIG. 7) connected to a switch fabric 86 adapted for the transfer of variable sized packets. Each module 72 preferably has a switching capacity of about two terabits per second. The modules 72 are connected by a passive core 74. The network core is required to provide an end-to-end path of an arbitrary capacity for each pair of modules 72. The capacity of each path may be dynamically modified in response to traffic loads and other network conditions. Each module 72 must sort its traffic into logical buffers according to destination, and regulate the rate at which traffic is sent from each buffer. The modification of the end-to-end capacities takes place at a rate that is slower than the rate of transaction processing at the modules 72. For example, the capacity of a given path may be modified every 1 millisecond while a module 72 transferring packets on a path may be transmitting packets at the rate of 10000 packets per millisecond. The capacity of a path may be modified in response to admission control requirements or it may be modified according to a level of occupancy of a buffer storing the packets of the path.

The modules 72 are preferably connected to optical cross connectors (OCCs) 84. The OCCs 84 are fully interconnected by optical links (not illustrated) Each optical link may support several wavelengths. A wavelength constitutes a channel, and each OCC 84 switches entire channels. Each OCC 84 is connected to each other OCC 84 by at least one channel. The entire optical core 74 is passive. An OCC 84 may be a simple channel shuffler, or an optical space switch. The use of optical space switches instead of channel shufflers increases network efficiency at the expense of control complexity, and the benefits do not necessarily justify the control complexity required for full optical switching.

At least one module 72 is connected to each OCC 84. Each module 72 receives data from sources 76–84 and delivers the data to sinks as directed by the respective sources. If each module 72 connects to only one OCC 84, then in a network of N modules 72, N being an integer greater than one, the set of paths from any module 72 to any other module 72 includes a direct path and N–2 two-hop paths between each pair of modules 72. The paths are rate-regulated, as will be explained below in detail. Hence, in establishing individual connections within a path, the sending module 72 in a two-hop path need not be aware of the occupancy condition of the downstream modules 72 associated with an indirect path.

Such a configuration greatly simplifies packet processing in a data network and facilitates network scalability to hundreds of terabits per second. One of the advantages of this architecture is the effective sharing of the optical core capacity. A global traffic overload is required to cause a noticeable delay. Global overload in any network, particularly a network with wide geographical coverage, is a rare event.

Each module 72 may access the optical core through two fiber links instead of just one fiber link. This double access increases the efficiency of the optical core and provides protection against failure. In some failure conditions in the optical core, a module 72 functions at half capacity, in which case, low-priority traffic may be discarded. Double access is preferable for large-scale modules 72.

UTM Connection Admission Control and Routing

UTM uses a distributed connection admission control method in which individual modules 72 negotiate end to end rate regulated routes for all communications sessions that pass through other modules 72. Although there is a network controller (not illustrated) in the UTM network, the network controller is only responsible for monitoring network condition, calculating and distributing least cost routing tables to the individual modules 72 and other global network functions. The network controller is not involved in connection admission control or route setup.

Figure 7:
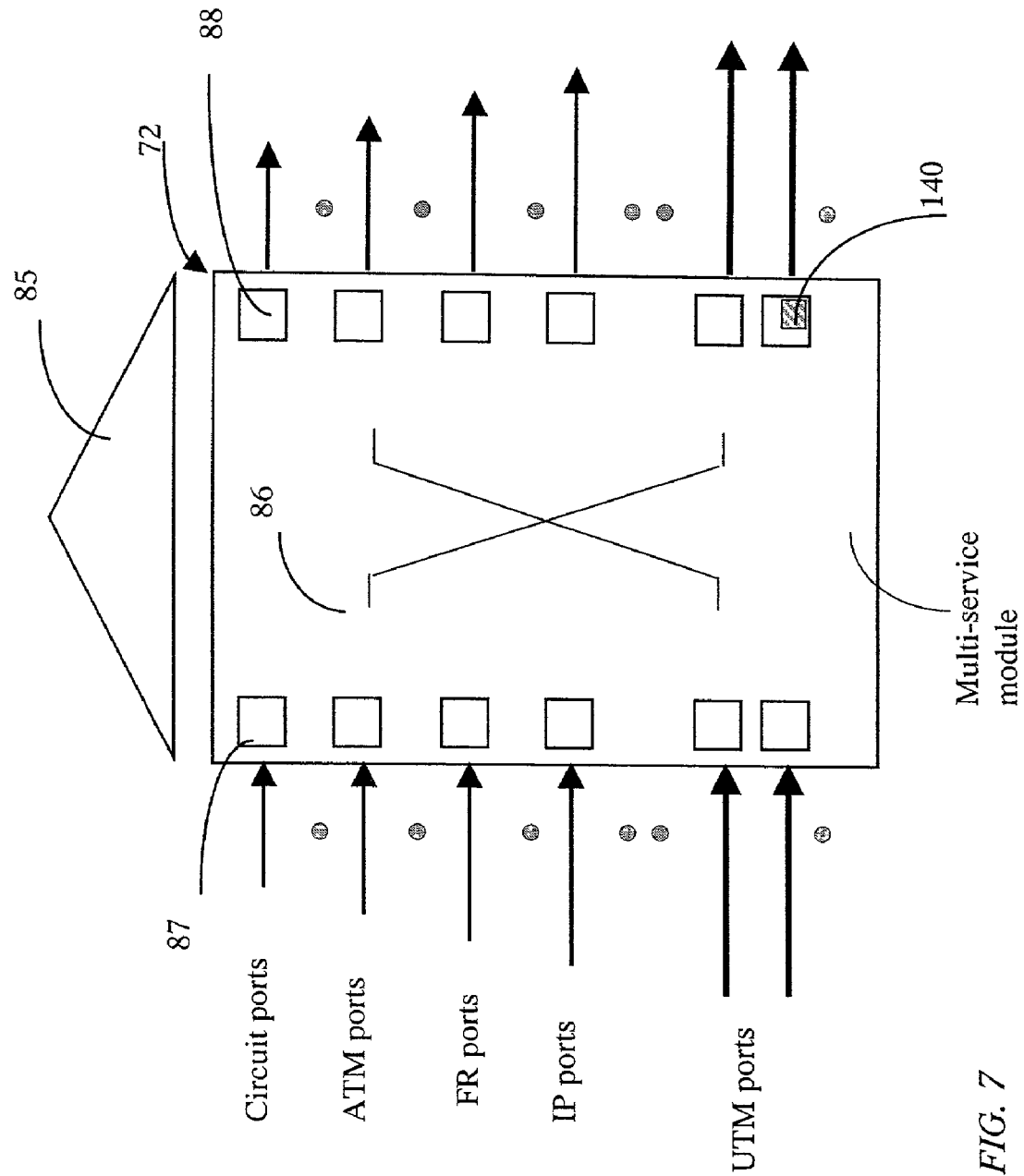
FIG. 7 is a schematic diagram of a UTM multi-service switch module in accordance with the invention.

FIG. 7 is a schematic view of a preferred embodiment of a module 72. Each module 72 includes a module control element 85, a switch fabric 86, a plurality of ingress port controllers 87 and a plurality of egress port controllers 88. Each egress port controller 88 includes one or more packet schedulers 140, which will be explained below in a section related to rate regulation in the UTM network. The module control element 85 receives least cost routing table information from the network controller on a periodic basis or as network topology changes due to the addition of modules 72, links, or core cross-connects 84, or the failure of any of those elements. The least cost routing tables are used by the module control element 85 to select a route for each path and for each high bit-rate connection admission request that warrants an independent connection. For low bit-rate connection admission requests, an existing path to the destination module is selected if a path exists. If a path to the destination module does not exist, a path may be created using the least cost routing tables if a module administrator has enabled the creation of a path to that destination. Low-bit rate connection admission requests to destinations for which a path does not exist and a path is not enabled in a path permission table (not illustrated) may be setup as an independent connection. To set up a path or a connection, the following least cost method of connection setup is used.

In the UTM network 70, each module 72 is connected to each other module 72 by a channel of fixed capacity; 10 gigabytes per second (Gb/s) for example. Due to spatial traffic variations, some traffic streams may need less capacity than an available direct channel while others may have to use the direct channel in addition to other parallel paths. A parallel path for a pair of modules 72 is established by switching at another module 72. In order to simplify UTM network controls, the number of hops from origin to destination is preferably limited to two; i.e., only one intermediate module 72 is preferably used to complete a path between two modules 72.

As explained above, there is a direct path and N–2 two-hop paths available to each connection in the UTM network 70 (FIG. 6); where N is the number of modules 72. With the restriction of a maximum of two hops per connection or path, a directional channel between a first and second module 72 may be supporting traffic of up to 2N–3 pairs of modules 72, where N>1. A directional channel x-y, joining a first module 72 to a second module 72 may support paths originating from the first module 72 and destined for the second module 72, as well as paths originating from the first module 72 to the remaining N–2 other modules 72. In addition there are paths originating from the N–2 other modules 72, excluding first and second modules 72, and terminating at the second module 72. In this configuration, each module 72 can send all its traffic to a specific other module 72 using the multiplicity of available parallel paths.

Each module 72 has N–1 outgoing channels and N–1 incoming channels, in addition to the channels connecting the data sources to the module 72. If the links are identical and each link has a capacity R (in bits per second), the interface capacity with the core of the distributed switch is (N–1) R. The selection of the capacity of module 72 allocated to data sources depends on the spatial distribution of the data traffic. With a high concentration of inter-modular traffic, the data source interface capacity may be chosen to be less than (N–1) R. Preferably, each module 72 is provisioned independently according to its traffic pattern.

In order to realize an overall high performance in the UTM network 70, each module 72 must have a core-interface capacity that exceeds its projected external traffic, because each module 72 may also be required to serve as a transit point for traffic between any two neighboring modules 72.

To promote efficient utilization of the network, the vacancy of all channels should be substantially equalized. This is best done, however, while taking unto account a cost of each route. Even though each indirect route may have only two hops, and consequently includes only two links, the route lengths may vary significantly resulting in a substantial cost difference. The basis for the route selection process preferred for a UTM network is adapted from a routing method described in U.S. Pat. No. 5,629,930, which issued to Beshai et al. on Mar. 13, 1997. In the method described therein, each pair of nodes has a set of eligible routes. Direct routes, if any, are attempted first. If none of the direct routes has a sufficient free capacity, a set of alternate routes is attempted. When there are two or more eligible routes, the two routes with the highest vacancies in the links emanating from an originating module 72 are selected as candidate routes. The decision to select either of the candidate routes, or reject the connection request, is based on the vacancy of completing links to a destination. The reason for limiting the number of candidate routes to two is to speed up the connection set-up process while still basing the selection on the true state of the links. Basing the route selection on the true state of a link requires that for any link that is being considered for a connection, the link must be made unavailable for consideration in another connection until a decision is made. This restriction normally results in slowing down the connection setup process.

In the fully meshed UTM network 70, the number of eligible routes for any module 72 pair is N–1, as described above. When N in large, of the order of 100 for example, the use of true-state routing using all eligible routes can be prohibitively slow. The reason is that each of the links involved is frozen to further routing setup until a decision is made on the connection request. It is therefore necessary to limit the number of candidate routes per connection. The preferred method for use in the highly-connected UTM network 70 is:

a) at each module 72, routes to a given other module are sorted in an ascending order according to cost which produces a vector of N−1 candidates (normally stored as N entries with a null entry corresponding to a pair of modules 72 where the origin and destination are the same). Each module-pair is assigned two arrays, the first, hereinafter called a transit module array, corresponds to route identification and the second is a cost array. A direct route may comprise a number of channels, but it is entered in the transit module array as a single candidate. Each of the N−2 routes that transfer data through intermediate modules 72 is identified by entering an identification number of the intermediate module 72 in the transit module array. A direct route is identified as a null entry in the transit-module array. A null entry may be any invalid entry, including the identification number of the originating module 72. Typically, but not necessarily, the direct route is the first entry in the routing list. The routing list is virtually static. It is modified only when the physical state of the UTM network 70 changes, and not necessarily as the occupancy of the network changes. Another vector stores an occupancy level of the first link to each of the N−1 modules 72.

b) to establish a connection, the routing list is inspected sequentially starting from the first entry in order to identify routes with sufficient capacity in their first link to accommodate a connection admission request. As explained above, the traffic admission control function is performed by the module control element 85 that imposes a limit of M candidate routes between each pair of modules 72 (M<N). M is normally a small number between two and four.

c) the overall free capacity of each route is determined by messaging to the intermediate modules 72 to inquire about the free capacity of their links to the destination module. The free capacity of the direct route is of course known at the originating module 72. The free capacity of a two-link route is the lesser of the free capacities of the two links.

d) the cost per unit of free capacity is determined as the ratio of the route cost and the free capacity of the route.

e) the route with the minimum cost per unit of free capacity is selected and the remaining candidate routes are released and made available to other connections.

Figure 8:
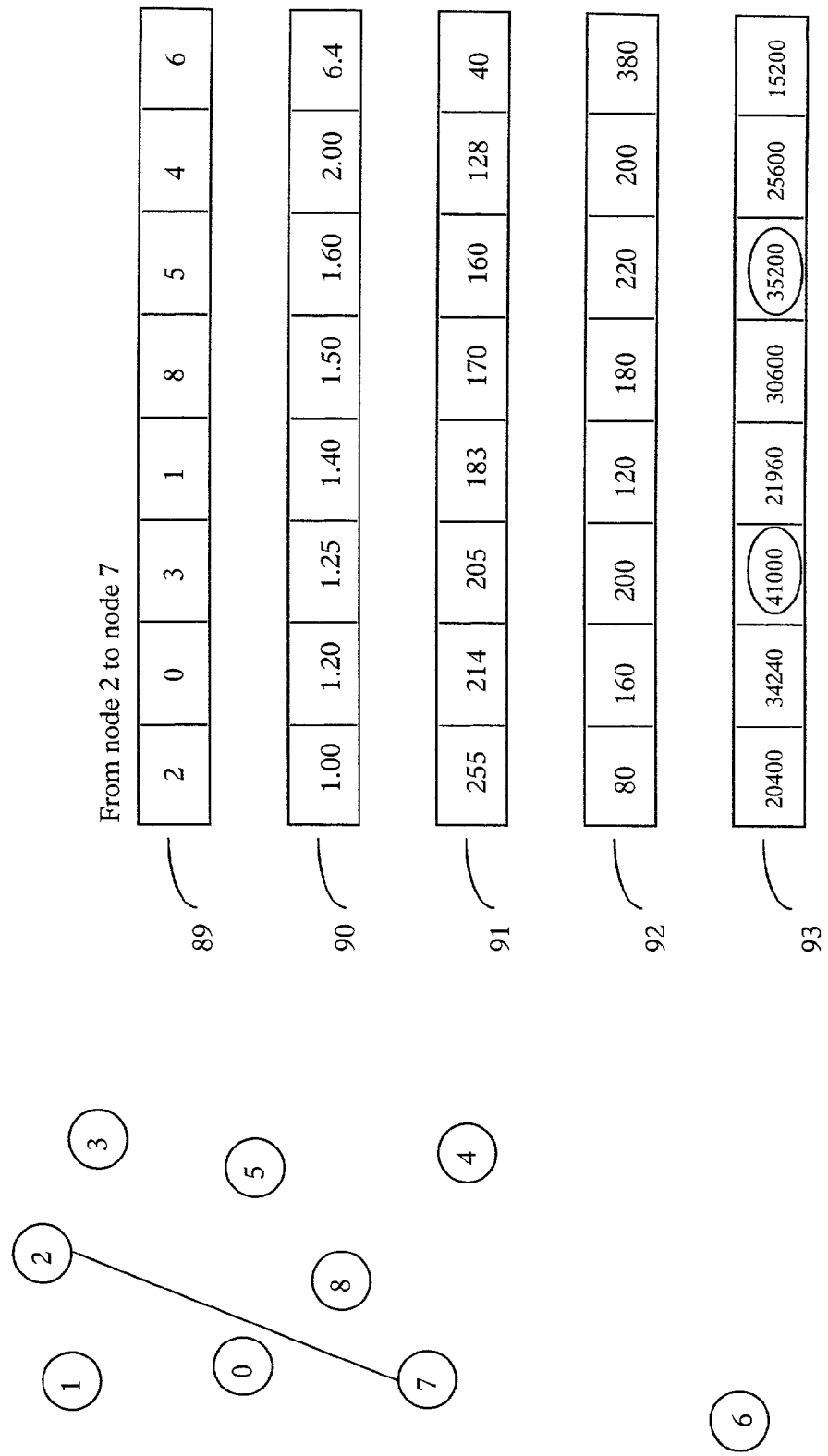
FIG. 8 is a schematic diagram illustrating an eight-module UTM network and memory arrays used in a method of least cost routing in the UTM network in accordance with the invention.

FIG. 8 is a schematic diagram illustrating the routing process in more detail. Nine modules (0–8) in a UTM network 70, and a least cost routing table for routes from module 2 to module 7 are shown. A similar least cost routing table exists in module 2 for routes from module 2 to modules 0, 1, 3, 4, 5 and 8, as well. The least cost routing table is schematically illustrated as including 5 arrays respectively indicated by references 89–93. Only four arrays are actually maintained in memory, arrays 90 and 91 being different expressions of the same value, as will be explained below. Array 89 identifies all the routes from node 2 to node 7 which are two-hops or less in length. The routes are arranged in shortest path order. Consequently, the direct route is identified by the originating module number (module 2), or any other null entry. Array 90 stores the relative static costs of each route. The direct route is normally, but not necessarily, the least cost route. The lowest cost is normalized to a value of one. Due to a possible wide variation in the route cost, the word length of each entry in array 90 must be large enough to maintain a reasonable accuracy. In order to minimize the word length in the cost array without sacrificing accuracy, it is preferable to store the inverse of the route cost. Thus, if the word length in array 91 is 8 bits, the least-cost route is represented as 255 and the inverse cost of a higher-cost route is represented by a number ranging from 254 to 0. This representation maintains a high accuracy for the relative route costs within an order of magnitude of the lowest cost. These are the routes that are most likely to be used for the node pair under consideration. Array 91 of FIG. 8 stores an integer representation of the cost inverse. This is preferred to the direct-cost array 90.

Route selection is a function of both the static cost and route vacancy. The vacancy of a multi-link route is the lowest vacancy in all the links of the route. These vacancies are stored in array 92. The product of corresponding entries in arrays 91 and 92 are stored in array 93. The route entry with the highest value in array 93 is the route selected if the route has sufficient free capacity to accommodate a connection admission request. In the proposed network configuration, the length per route is limited to two links. The vacancies of emanating links are available at each node. Obtaining information about the vacancy of the completing links, with the intention of including one or more of the completing links in the end-to-end route selection, requires that the occupancy of all the links under consideration be made unavailable to any other route selection process for any node pair.

In a large-scale network, a route selection process based on examining all intermediate nodes can be prohibitively slow. To circumvent this difficulty, an efficient solution is to sort the entries in array 91 in a descending order, and arrange arrays 89 and 92 in the same order. The route selection process then selects a reasonable number of candidate routes, each of which must have sufficient free capacity in its emanating link, starting from the first entry in array 89. If four entries, for example, are selected as candidates, then only the first four entries in array 92 and, hence, the first four entries in array 93 need be determined. The number of routes to be considered is a function of the class of service of the connection and the requested bit rate. Typically, high bit rate connection admission requests have different routing options than low bit rate requests. Network administration or service subscribers may determine the rules governing this process.

In the example shown in FIG. 8, a path of 100 Mb/s is requested and all routes are considered as candidates. The route from node 2 to node 7 through intermediate node 3 has the highest value in array 93 and is consequently selected to accommodate the path.

If a relatively low-bit rate connection is requested for a communications session to a destination module 72 to which a path exists, the module control element 85 accepts the connection admission request if adequate resources exist in the path. There is no necessity for the module control element to check with downstream modules 72 to allocate a resource for the connection because the downstream modules have all committed to the capacity of the path. A control packet must be sent to downstream modules to set up the connection within the path (see FIG. 1*b*) to permit the ingress port controllers 87 at the downstream modules to update their connection control tables (FIG. 11) as will be described below. If inadequate resources remain in a path, the module control element 85 may request more path capacity by sending an appropriate control packet (FIG. 1a). For connectionless packets, if the capacity of a path to the destination module for the packets is fully committed, the connectionless packets are refused. If the path capacity is not fully committed, however, the connectionless packets are accepted and the packets are preferably assigned a connection number and moved through the UTM network as resources permit, as will be explained below in more detail. Consequently, connection admission control and routing are distributed in the UTM network, and all traffic is end-to-end rate regulated. The traffic rate is controlled at the source module and congestion in the core is thereby avoided.

Routing Mechanism

With reference again to FIG. 9 which depicts the routing mechanisms associated with each module 72, it should be noted that all the components shown relate only to the route setup process and are not engaged in the data transport process. The ingress ports comprise a number of ports 95 incoming from local traffic sources (not shown in the figure) and a number of ports 98 incoming from other modules. The egress ports comprise a number of ports 96 delivering traffic to local sinks (not shown in the Figure) and a number of ports 97 delivering traffic to other modules. The ingress ports incoming from local sources are called local ingress ports 95, the ingress ports 98 incoming from other modules are called core ingress ports 98. Similarly, the egress ports connected to local sinks are called local egress ports 96, and the egress ports connected to other modules are called core egress ports 98. FIG. 10 shows an example of a five-module network, with each module 72 having local ingress ports 95, local egress ports 96, core ingress port 98 and core egress ports 97. The modules are interconnected by links joining pairs of core egress and ingress ports of different modules. Module A may send its data to module C by the direct route 99, or one of selected two-link routes such as route 100–101 through module D or route 102–103 through module E.

Figure 11:
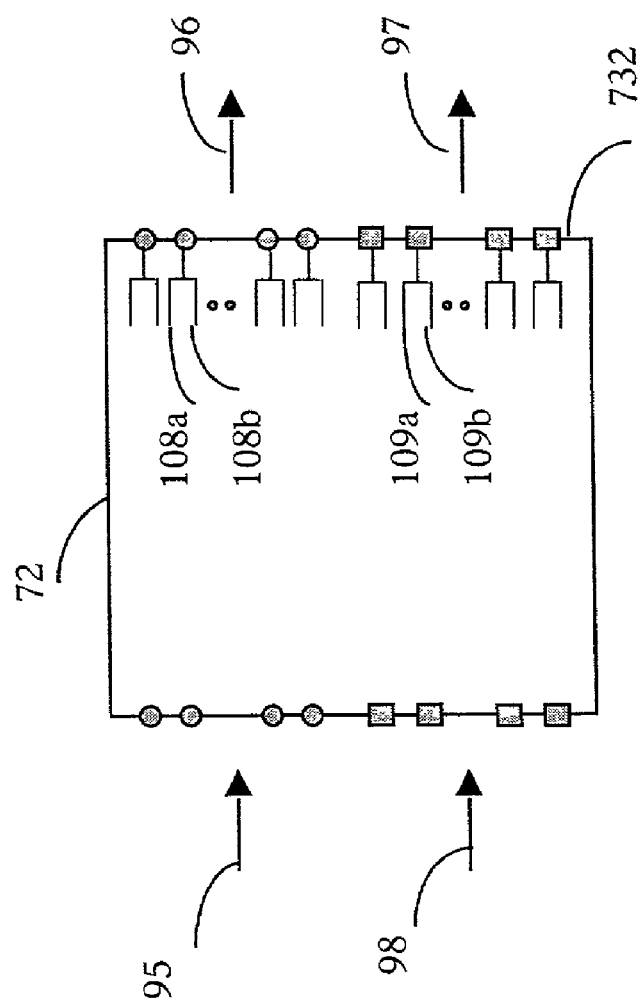
FIG. 11 is a schematic diagram of the switch module shown in FIG. 9, the local ports being designated by shaded circles and the core ports being designated by shaded squares.
Figure 13:
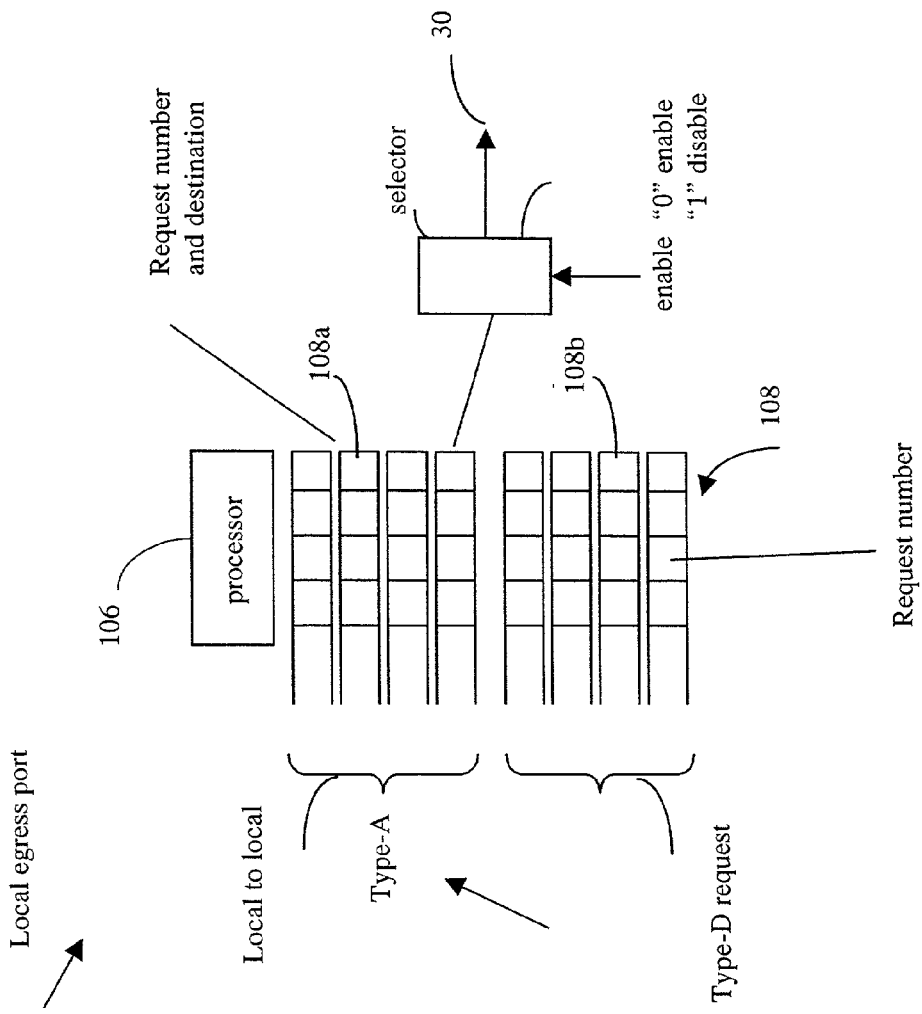
FIG. 13 is a schematic diagram of a local egress port routing request processor and routing request queues in the apparatus shown in FIG. 11.
Figure 14:
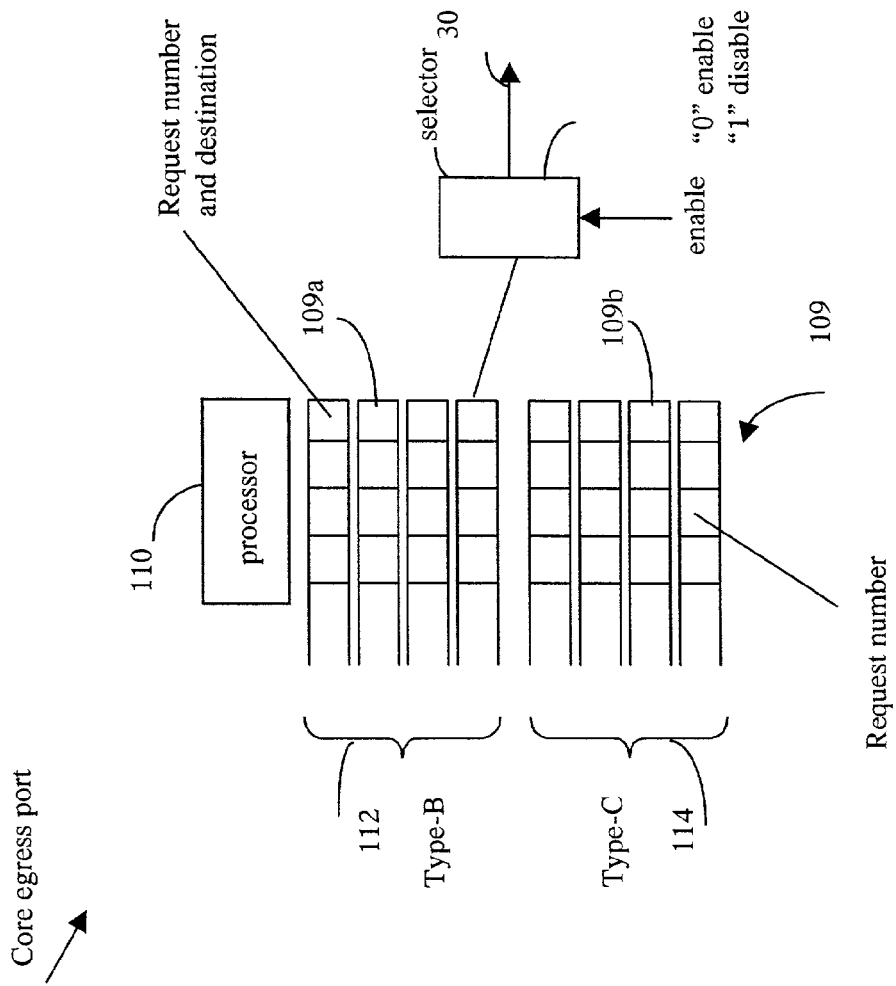
FIG. 14 is a schematic diagram of a core egress port routing request processor and routing request queues in the apparatus shown in FIG. 11.
Figure 15:
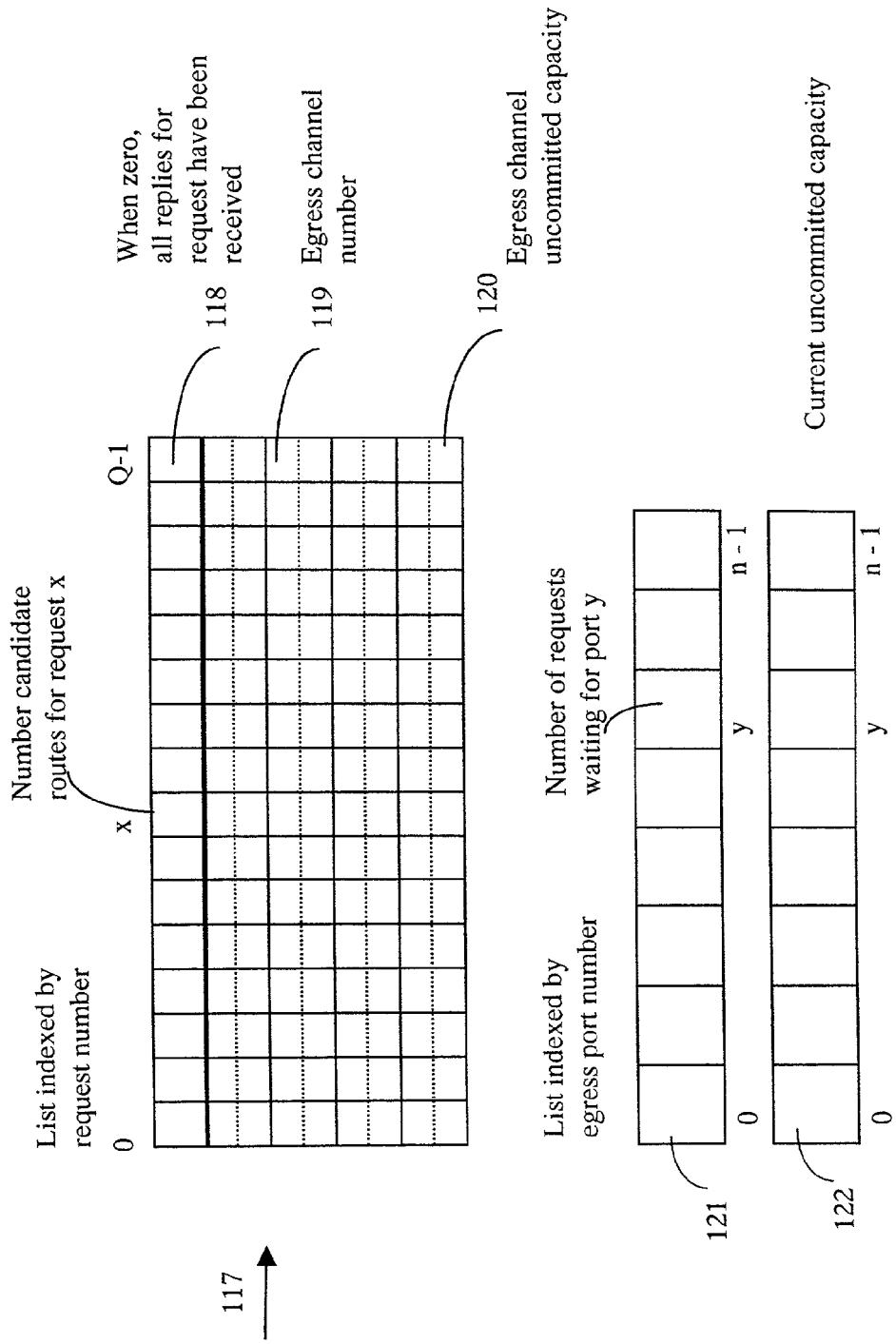
FIG. 15 is a schematic diagram of control tables used in processing routing requests in the method in accordance with the invention.

Each local ingress port 95 may receive connection setup requests from several sources, each being destined to one or more sinks. The ingress processor may also initiate a path setup request. The requests received from each local ingress port 95 are queued in an associated ingress buffer 104 and processed under control of a processor 105 which communicates the requests to the routing processor 94. A memory associated with the routing processor 94 stores configuration tables and link state tables as shown in FIG. 15. Each local egress port 96 (FIG. 9) has a processor 106 controlling an egress queue 108 for routing process requests. The local egress queue 108 is logically partitioned into two sections 108a and 108b as shown in FIG. 11. Queue 108a receives routing requests from local sources to local sinks and queue 108b receives routing requests from other modules destined for local sinks. Each core egress port 97 has a processor 110 (FIG. 9) controlling an egress queue 109, which is logically partitioned into two sections 109a and 109b as also shown in FIG. 11. Queue 109a receives requests from local ingress ports 95 of the same module and queue 109b receives routing requests from the core ingress ports 98 of the same module. Queue 108b is given priority over queue 108a and queue 109b is given priority over queue 109a. The reason for this is explained below. Each egress queue 108a, b and 109a, b may be further sub-divided into several sub-queues as shown in FIGS. 13 and 14, in order to facilitate grade-of-service differentiation.

Figure 12:
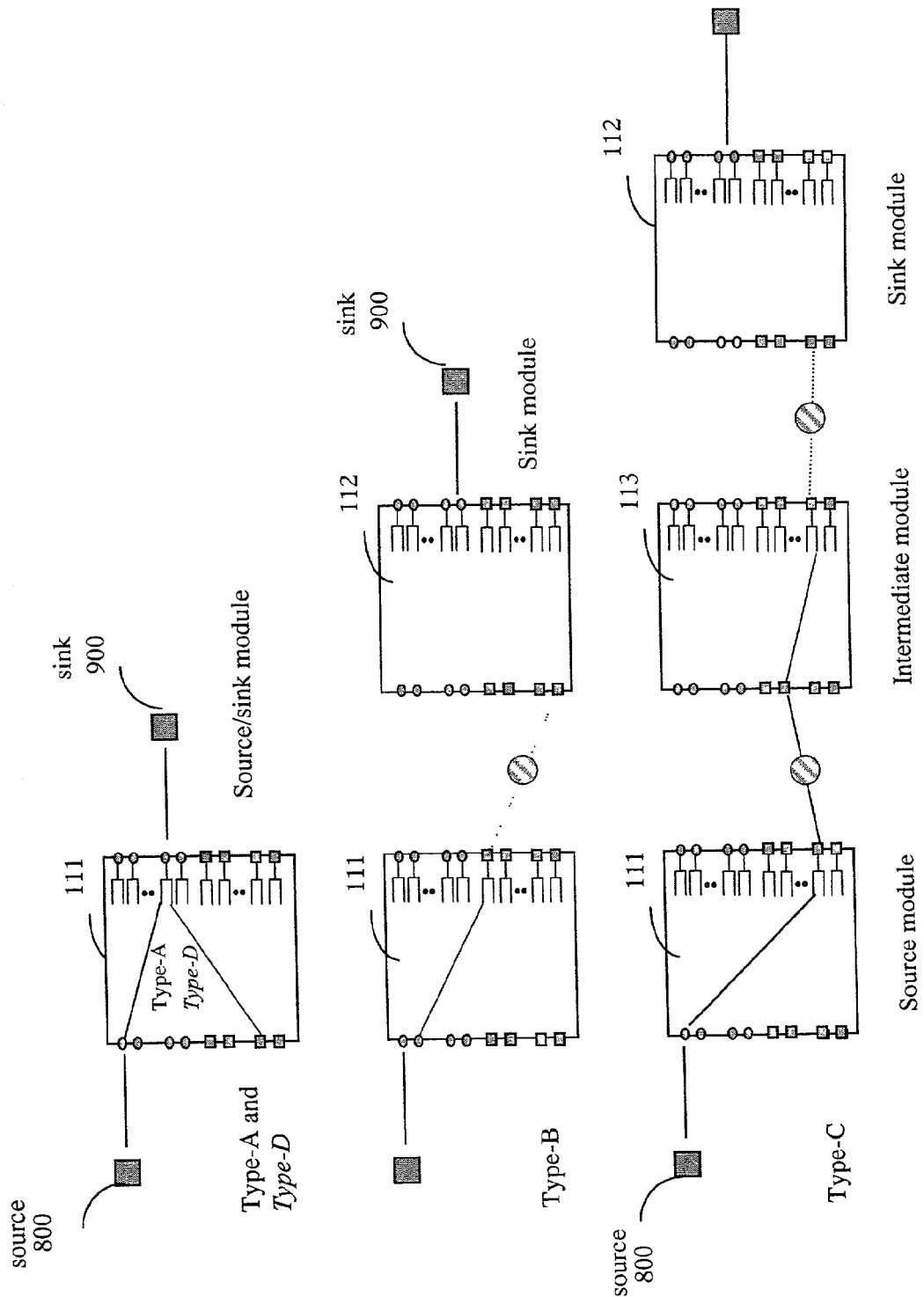
FIG. 12 is a schematic diagram illustrating a path through the network traversed by four types of routing requests in accordance with the routing method of the invention.

FIG. 11 is a schematic diagram of a module 72 illustrating the symbols used in FIG. 12 to illustrate the method of processing routing requests. As shown in FIG. 11, the local ingress ports are represented as shaded circles 95, the local egress ports are represented by shaded circles 96, the core egress ports are represented by shaded squares 97, and the core ingress ports are represented by shaded squares 98.

The route setup requests are divided into types according to a topological position of the source and the sink. FIG. 12 shows how the four types of routing requests (A, B, C and D) are processed. A source module 111 issues a type A request to connect to a sink served by the same module 111. A source module 111 issues a type B request to setup a route to a sink served by a sink module 112. The sink module 112 may be connected to the source module 111 by a direct link or by a two-hop route. In either case, the type B request is an intra-module request which is sent to a low priority queue. The type B request may be multicast to a number of core egress ports 97 in order to perform selective routing based on a comparison of the uncommitted capacity of several candidate routes. The type C request shown in FIG. 12, originates as a type B request in the source module 111, but it is a type C request in the intermediate module 113. A type C request is given high priority because the links related to the request are frozen to any other routing request processing until a routing decision is made, as will be explained below in more detail. A type D request, shown at the top of FIG. 12, is received by a sink module 111 and sent to the sink 900 at high priority because a delay in processing the type D request ties up network resources.

Routing Procedure

New paths and independent connections in the UTM network require an efficient method of routing. Two methods for implementing routing in the UTM network are described below. The first method is true-state routing which is believed to provide the best route for any connection through the network, given criteria respecting the best route. The second method is fast routing which uses near-true-state information to make routing decisions with essentially no messaging. Although the fast routing method is not guaranteed to find the best route for any connection, it can improve routing setup time while generally having a high probability of finding the best route. Each method is preferably implemented using certain hardware components in the modules 72 that are described below.

A routing request number is an identification number, preferably selected from a set of consecutive numbers starting with zero, given to each routing request and returned to the set after completion of the routing process. A routing request number is used only for route selection and is therefore active only for a short time during route setup, which may be of the order of a few milliseconds. By contrast, a path number or a connection number may be active for several hours. The set of routing request numbers should include sufficient numbers to ensure that a large number of route setups may proceed simultaneously. Nonetheless, the highest request number is much smaller than the highest path or connection number due to the difference in holding time. For example, if 1000 routing requests per second are received at a given module, and if it takes an average of 10 milliseconds to setup a route (mostly propagation rather than processing delay), then the mean occupancy of the routing request number set is 10. Assigning 64 numbers to the set, for example, would reduce the probability of request blocking due to a shortage of routing request numbers to near zero.

The highest routing request number in a consecutive set of numbers starting with zero should be adequate to ensure no blocking, but not unnecessarily large so that large high-speed memories would not be needed for routing request number storage.

Figure 9:
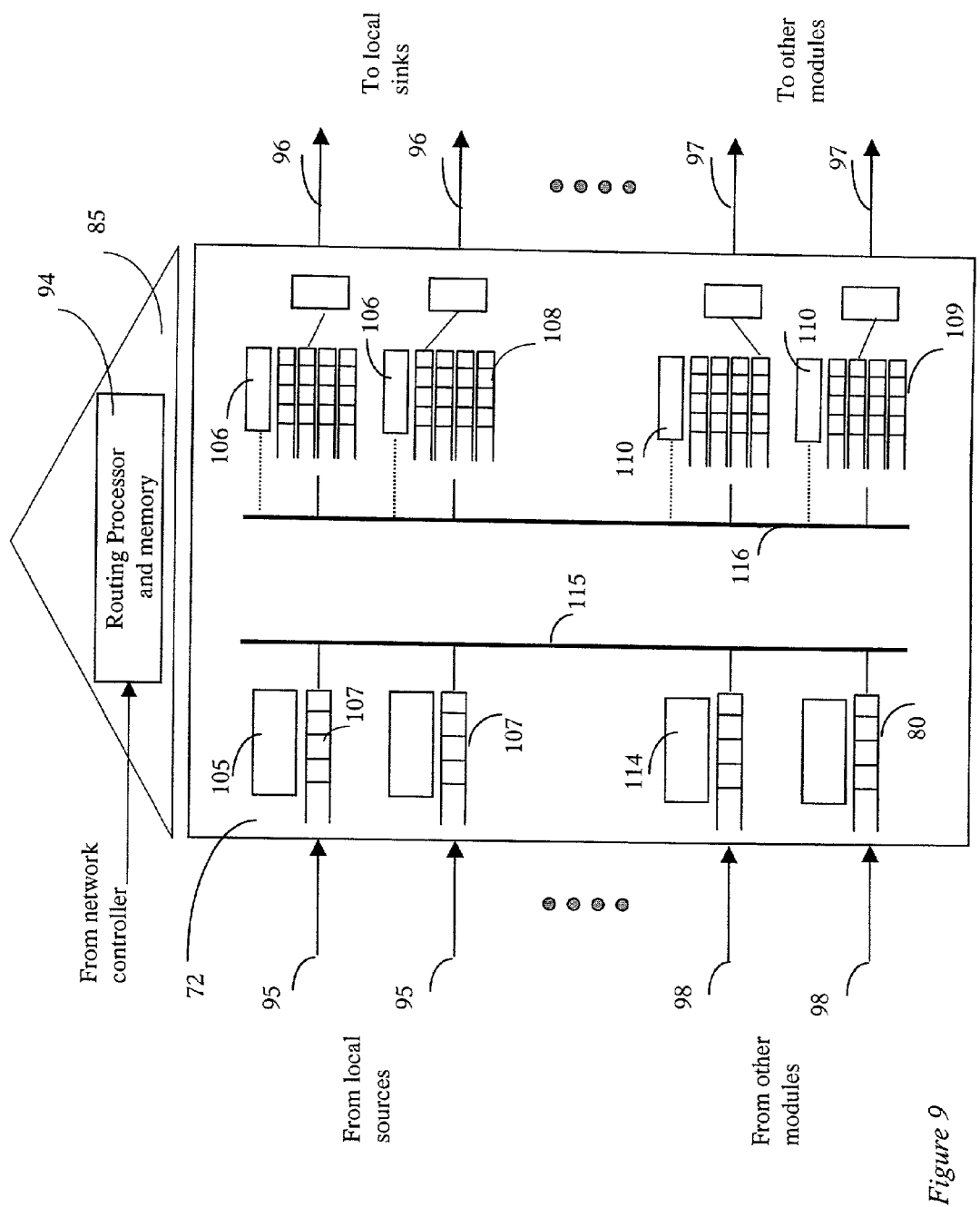
FIG. 9 is a schematic diagram illustrating an apparatus in a multi-service switch module in accordance with the invention for routing control in the UTM network.
Figure 10:
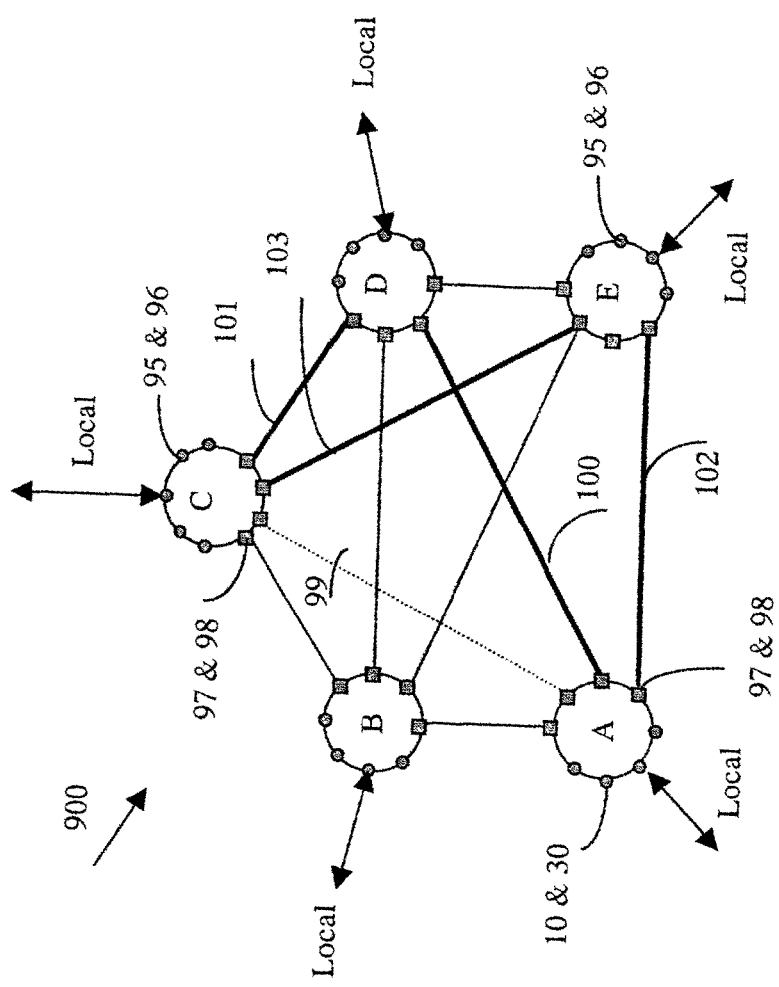
FIG. 10 is a schematic diagram of a UTM network consisting of five switch modules to illustrate the routing method in accordance with the invention.

FIG. 9 shows a schematic diagram of a UTM module 72 equipped with routing apparatus in accordance with the invention. The routing apparatus includes a processor located on each ingress port controller 87 and each egress port controller 88 of the module 72 (FIG. 7). A routing processor 94 (a part of the module control element 85) communicates with the processors located on the ingress/egress controllers. A connection admission request received at a local ingress port 95 generates a routing request called a "type-A" request if the call is destined for a local egress port 96, or a "type-B" request if the call is destined for a core egress port 97. A request from a core ingress port 98 destined for a core egress port 97 is called a "type-C" request. In a fully-connected network or distributed switch which limits the number of hops per route to two, a module receiving a type-C request is directly connected to the sink module indicated in the request. Allowing the requests to proceed to the sink module results in unnecessary duplication of effort. When several candidate routes are investigated for a given request, copies of the same request would reach the sink module at core ingress ports 98 from several other modules, each request message seeking the same information, which is the uncommitted capacity of a local egress port 96 belonging to the sink module.

A preferred alternative is let routing processor 94 of the source module send a direct request to the sink module to query the uncommitted capacity of the targeted local egress port 96. Such a direct request is hereafter called a "type-D" request. A type-D request is preferably forced to use the direct link between the source module and the sink module, except in cases of failure of the direct link. In that case, an alternate path may be designated for this purpose. The routing processor 94 at the sink module determines whether the uncommitted capacity is sufficient to accommodate the request. In addition, in the case of an independent connection, when the local egress port 96 of the sink module receives a type-D request, it communicates with the sink to determine whether to accept or reject the route setup. Thus, the sink module rejects a request if the designated local egress port 96 has insufficient uncommitted capacity, or if the sink is not willing to accommodate the request for any reason. If the route setup request is accepted, the routing processor 94 of the sink module modifies the uncommitted capacity indicated in an egress channel table 117 (FIG. 15). There are three options of timing the transmission of a type-D request. The first is to send the type-D request after a route to the sink module has been selected. With this option, once the sink accepts the setup request, the source can start transferring packets as soon as it receives the acceptance from the sink module. The disadvantage of this option is the time and effort sacrificed in the route selection process if the sink refuses the request. The second option is to send a type-D request first and, if the sink module accepts the request, the egress channel vacancy entry for local egress port 96 in table 117 can be adjusted accordingly. A type-B request is then processed to find the best route between the source module and the sink module. This option conserves network resources, since the route selection effort is avoided if the sink module rejects the request. However, like the first option, it results in a high delay since the type-B and type-D requests are processed sequentially. The third option is to process the type-B and type-D requests concurrently. The setup delay is then determined by the slower of the route selection process and the sink-module approval process. This minimizes the setup delay but may result in some wasted processing effort if a route to the sink module is found but the sink module rejects the request, or vice versa.

Grade-of-Service and Quality-of-Service Classification

The grade-of-service (F4, Table 1) is a metric that quantifies the performance of the connection or path set-up. This metric is usually expressed in terms of the setup delay and blocking. The quality-of-service (F5, Table 1) is a metric that quantifies the performance of the data transfer process, following the route setup, and is usually expressed as the data transfer delay or the data loss rate. The data transfer delay may be represented by the moments of the delay (mean, second-moment, etc.) or by the probability of exceeding predefined delay thresholds. Grade-of-service differentiation can be realized by several means, including priority processing. It should be noted that the grade-of-service and quality-of-service designations are not necessarily related.

Routing Request

An originating module initiates a route selection process for a path or an independent connection by issuing an appropriate UTM packet which identifies the destination module (F10), the desired bit-rate (F12), and a designated grade-of-service (F4). The grade-of-service influences the route-selection process by controlling the route search effort and by granting processing priority accordingly. These differentiators result in different levels of blocking and setup delay, even for requests with similar bit-rate requirements bound to the same destination.

Priority Queuing

As described above, each local egress queue 108 is divided into two sets of sub-queues 108a, 108b. The first set 108a stores local route requests, i.e., type A requests. The second set, 108b stores requests arriving from other modules for the purpose of procuring a reserved bit-rate to a local egress port 96, i.e., type D requests. If the route setup is related to an independent connection, the acceptance of the connection by the sink is required.

Similarly, each core egress port 97 in a module 72 is separated into two sets of sub-queues FIG. 14. The first set 109a stores type-B requests originating from local ingress ports 95 of the same module. No resources are reserved when a type-B request is queued at an egress port in the same module. However, when it is dequeued, the link leading to the sink module is frozen to further routing request processing until a route selection is made. The second set 109b stores type-C requests which are treated as type-B requests in a neighboring source module 111 and are forwarded to the intermediate module 113 in order to obtain information on the vacancy of a link between module 113 and the sink module 112. For each type-C request received at intermediate module 113 the link from the source module 111 to intermediate module 113 is frozen to other routing request processing as is the link from the intermediate module 113 to the sink module 112, although the routing request is not forwarded from the queue 109b to the sink module 112. It is therefore desirable to process type-C requests as soon as possible. As described above, each sub-queue 109a and 109b may be further subdivided into several more sub-queues for grade-of-service differentiation.

Each module is provided with internal communications buses for sending messages from ingress port processors 105, 114 to egress port processors 106, 110 and routing processor 94. As shown, in FIG. 9, shared buses 115 and 116 preferably perform this function.

Route Setup

As described above, the treatment of routing requests differs substantially according to the routing request type. In the following, a port is said to be in state "0" if it can be considered in a new route setup. Otherwise, it is in state "1". For all routing request types, however, a request is dequeued at egress only when the egress port is in a state "0", i.e., when the port is not engaged in another routing request. A type-A request is queued in a sub-queue 108a. When dequeued, the request is sent to the sink to seek its acceptance of the connection admissions request. If accepted, a reply is sent to the source from the source module 111 (FIG. 12) informing the source to proceed. Otherwise, a rejection message is sent to the source. A type-A request has a single non-blocking route to the local egress port 96 supporting the sink. Type-A requests are the fastest to process and they do not consume inter-modular channel resources. Type A requests are enqueued in the lower priority egress queues 108a (FIG. 11) in order to speed up the overall routing process as discussed earlier. The communications required to process a type-A request is preferably handled by the routing processor 94.

A type-B request may have several candidate routes and may, therefore, be queued in several sub-queues 109a associated with links to different neighboring modules. Each request must be delivered to the routing processor 94, through a bus 115, for example (FIG. 9). The processor executes a candidate-route selection algorithm and determines the set of core egress ports 97 that will participate in the route selections. The request is sent to those ports and queued in the appropriate sub-queues 109a according to the grade-of-service index for the associated connection admission request. Meanwhile, routing processor 94 enters the number of candidate routes and the identity of the selected ports in a request-control table 117 (FIG. 15). An array 121 is used to store the number of routing requests waiting at each egress port. In the candidate route selection process, it is preferable to avoid an egress port with many waiting requests, as determined from array 121 of FIG. 15. The reason is twofold. Firstly, the setup delay may be excessive. Secondly, with many waiting requests, the uncommitted capacity at the time a new request gets its turn is likely to be smaller than that of the competing routes. Therefore, it is a good policy to temporarily eliminate a candidate route traversing ports having a large number of waiting requests from the list of candidate routes. A reply is expected from each of the candidate modules connected to the selected core egress ports 97. The number of candidate routes is defined as the number of pending replies. The number of pending replies is stored in an entry in row 118 (FIG. 15) opposite the request number. When a type-B request is dequeued from a sub-queue 109a (FIG. 14), the associated port is assigned a state "1". If the link associated with the core egress port leads to the module supporting the sink, the dequeued type-B request is discarded. Otherwise, the dequeued type-B request is transferred on the associated egress link which connects to a core ingress port 98 of an intermediate module to the module supporting the sink. The current uncommitted capacity of each adjacent egress link is known to routing processor 94 (see FIG. 15, array 122). The identity number of each selected egress port, and the uncommitted capacity of the link connecting the egress port to its designated neighboring module are entered in the appropriate entries in table 117, in a row 119 and 120, respectively, opposite the request number. If the egress port is connected by a link to the sink module, the associated link is frozen to further routing request processing. If the egress port is connected by a link to a module other than the sink module, the request is forwarded to the intermediate module where it is a type C request.

The ingress processor 114 (FIG. 9) sends a type-C request to the routing processor 94 which enqueues the request in one of the egress sub-queues 109b, determined according to the grade-of-service index. Sub-queues 109b are given a higher priority than sub-queues 109a since each request waiting in a sub-queue 109b freezes the incoming link from the source module to all other routing request processes. Giving priority to requests in sub-queues 109b speeds up the entire route setup process. When a request in sub-queue 109b is dequeued, the associated link is frozen to further routing requests and the request is discarded. It is not forwarded to the sink module but the core egress port 97 is assigned the busy state "1". The only purpose of queuing the request in a sub-queue 109b at the intermediate module is to determine the uncommitted capacity of the associated link, which is sent back to the source module by the routing processor 94 of the intermediate module. A reply message containing the request number, the identity of the intermediate-module, and the vacancy of the link to the sink module is sent back to the source module. The routing processor 94 of the source module uses the reply message to update table 117. The table is updated by subtracting unity from the number of pending replies, and by replacing the uncommitted capacity corresponding to the request number and egress-link number with the received uncommitted capacity, if it less than that of the adjacent link. The purpose is to determine only the lesser of the uncommitted capacity of the two links. When the number of pending replies reaches zero, routing processor 94 computes the cost-weighted measure for route selection as described above, and selects the candidate route with the highest score. The other candidate routes, if any, must release the resources that were frozen by the associated routing requests. A reply is therefore sent by the source module to each intermediate module involved in a candidate route that was not selected in order to change the state of frozen ports (links) from "1" to "0", and hence permit the processing of the next waiting routing requests to proceed. If the count is not zero, a time-out procedure is invoked and a routing decision is made with partial information.

A time-out must be set for reply. If a request expects several replies, and at least one is timed out, the entry in row 118 (FIG. 15) corresponding to the request can not reach zero. In such a case, the route selection process may proceed with incomplete replies. However, the request number of a request processed with incomplete replies should not be returned to the pool of free request numbers immediately. The request number may be returned to the pool after a sufficiently large delay, of the order of a few milliseconds plus the highest round-trip propagation time. A default value of 200 milliseconds would suffice for the worst case.

Speeding-Up the Route-Setup Process

In order to fulfil grade-of-service and quality-of-service agreements, it is of paramount importance that the route selection be based on the true state of the links of candidate routes, as in the above procedure. This requires that links under consideration be frozen, as described above, until a route selection is made and, consequently, results in slowing down the route setup process. With true-state routing, the main contributor to the route selection delay is the propagation delay which is not controllable. In order to avoid this delay and realize a high throughput, in terms of the rate of connection or path setup, several measures may be taken such as the delegation of the routing decision to an intermediate module and a partial-selectivity method which times out waiting requests, as described in U.S. Pat. No. 5,629,930.

In accordance with the present invention, a direct route with sufficient uncommitted capacity for a routing request may not be selected if an alternate two-link path temporarily has a significantly more end-to-end uncommitted capacity that the cost per unit of vacancy is smaller than that of the direct route. Thus, even when the direct route can accommodate a routing request, several other candidates may also be considered, and several links may be frozen until a decision is made. A compromise, which can speed-up the process without sacrificing the network's transport efficiency, is to establish an uncommitted capacity threshold beyond which a direct route is selected if it can accommodate the routing request. Equivalently, a direct route is selected if the remaining uncommitted capacity after accommodating the request exceeds a predetermined threshold.

Fast Route Setup

An alternative routing method is referred to as fast route setup. The fast route setup differs from the true-state method in that near-true-state information is used to make fast routing decisions with minimal messaging. In order to provide the routing processor with near-true-state information on which to make routing decisions, uncommitted capacity information is provided to the routing processor 94 by each of its neighboring modules. The near-true-state information is used to make routing decisions without signaling. After a routing decision is made, a routing confirmation message is sent to the neighboring module to confirm the route. If properly managed, this method can significantly improve route setup time.

Each module 72 has Y>0 neighboring modules. The Y neighbors of any given module 72 are the modules connected by a direct link to the given module 72. The direct link(s) connecting the given module 72 to any one of its Y neighbors is an adjacent link to the given module 72. A link that connects any one of the Y neighboring modules to any other module than the given module 72, is a non-adjacent link to the given module 72.

A routing processor 94 is fully aware of the uncommitted capacity of each of the adjacent links of its module 72, since this information is kept current by updates associated with each connection admission and each connection termination. Uncommitted capacity data for non-adjacent links is not available, however, because that data is stored locally in the memory of each routing processor 94.

The main contributor to route setup delay in the true-state routing method is the propagation delay, rather than the processing time, involved in sending and receiving messages to obtain uncommitted capacity information for non-adjacent links. The route setup delay can be significantly reduced if all the information required for true-state routing is available at an origination module 72. Although the routing processor 94 of the origination module has current information respecting the uncommitted capacity of each of its adjacent links, the uncommitted capacity of the non-adjacent links may be required to determine the best route for a path or an independent connection.

One solution is to disseminate the uncommitted capacity information by broadcasting, with each module periodically broadcasting the uncommitted capacity of its adjacent links to each of its Y neighboring modules. In a network configuration where a maximum of two hops is permitted for each route, it is sufficient that each module broadcast only the uncommitted capacity of its adjacent links. The uncommitted capacity data received by a given module M from neighboring modules is used only to update memory tables in the routing processor 94. No flooding is enabled. Thus, the process of uncommitted capacity information dissemination is manageable and transfer capacity is negligibly affected. However, when the number of modules 72 is large, of the order of several hundreds for example, the volume of the uncommitted capacity data may be significant, and much of the data related to non-adjacent links may never be used.

It is therefore desirable to find an efficient way of filtering the uncommitted capacity information so that, instead of broadcasting to all neighbors, the information is multicast to selected neighbors. The preferred method of filtering the information is based on selectively determining at each module 72 a subset of its adjacent links that are most likely to be used by each neighboring module M.

Figures 16A, 16B, 16C:
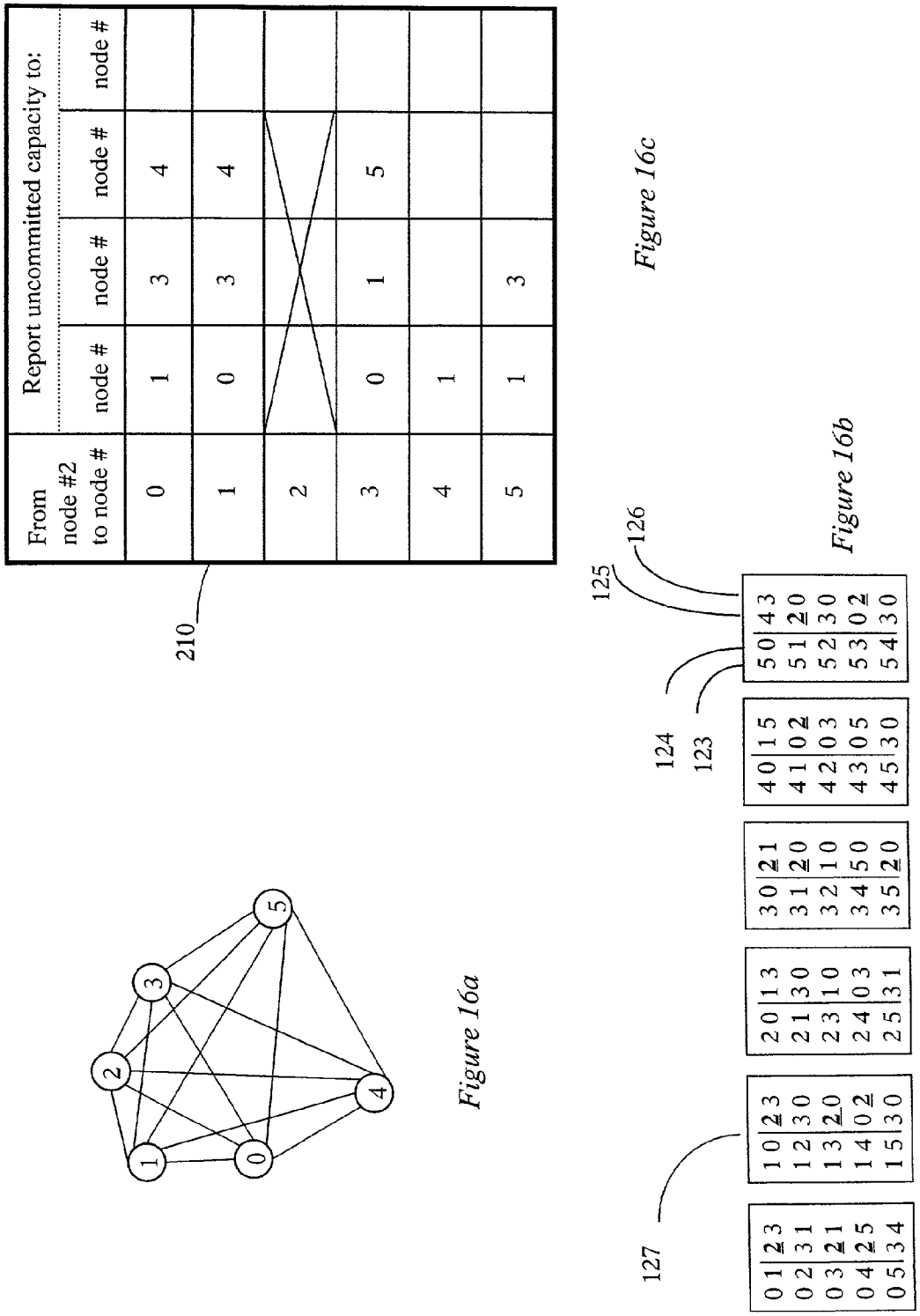
FIGS. 16a–c are network diagrams and tables used for illustrating the information dissemination required for a fast-routing method in accordance with the invention.

The method is best explained by way of an example. FIG. 16a illustrates a network containing six modules 72. A list of routes from each module to each other module, sorted according to cost as shown in the example in FIG. 8, is available in the memory of the routing processor 94 of each module. The first L members of this list, L being a predefined integer, are considered to be the most probable routes to be used by a neighboring module M to complete a two-hop connection or path. The uncommitted capacity of the direct link with the neighboring module M is not included in the list because the true state of that link is available locally. The number L can be different for different module-pairs, and can be based on a measured volume of routing requests. However, in the example lists shown in FIG. 16b, the number L is set at two for each module pair for ease of illustration. Each row in the lists shown in FIG. 16b includes four numbers respectively indicated by the references 123, 124, 125, and 126. These four numbers respectively identify a source module, a sink module, a first intermediate module, and an alternate intermediate module, respectively. Thus, the selected two-hop routes from module 0 to module 1 are 0-2-1 and 0-3-1, and for module 4 to module 3, the selected two-hop routes are 4-0-3 and 4-5-3.

It should be noted that the data of FIG. 16b is relatively static and may therefore be maintained by the network controller (not illustrated). The table of FIG. 16c is derived from the table of FIG. 16b. The underlined entries in FIG. 16b correspond to node-pairs which use node 2 as an intermediate node. For example, node-pairs (1,0), (1,3), and (1,4) may establish paths through node 2. Hence, the state information of links (2,0), (2,3), and (2,4) are of interest to node 1 and are sent to node 1 by node 2.

The network controller may be used to perform such control functions, which need not be completed in real-time. The network controller preferably constructs the table sets 127 shown in FIG. 16b, based on its knowledge of the entire network topology and cost factors associated with the various routes, and sends each table set 127 to the relevant module 72. The table of FIG. 16c, which is shown only for module 2, can be constructed using a distributed data exchange process among the modules, or by the network controller. As shown in FIG. 16c, module 2 should send the committed occupancy of its adjacent links 1, 3, and 4 to module 0, the committed occupancy of its adjacent links 0, 3, and 4, to module 1, and so on. The routing processor 94 of each module is aware that the uncommitted capacity information it receives from another module represents the uncommitted capacity of specific predefined links and can, therefore, associate the data received with their respective links. Thus, it is not necessary to transfer the link identities with the uncommitted capacity information. The word length of the binary representation of each of the uncommitted capacity is selected to realize a predetermined granularity to ensure accuracy. If, for example, the capacity of each link is 10 gigabits per second, and if it is desired to represent the bit-rate of a route (connection or path) as an integer multiple of 1 kilobit per second, then a 24-bit word would be required. The uncommitted capacity of the links indicated in each row in FIG. 16c are sent by the routing processor 94 of the relevant module 72 to the respective modules indicated in column 210. The frequency at which the information is transferred is a matter of design choice. Normally, an update with each change of uncommitted capacity on a link imposes too much of a signaling burden. Updates can therefore be periodic, say every millisecond, or at every significant change in uncommitted capacity. Since the admission or termination of a single connection in a 10 gigabit per second link does not normally affect the uncommitted capacity of the link to any significant extent, updates may be limited to significant changes in uncommitted link capacity of, for example, 1% or more.

In each module 72, the uncommitted capacity of non-adjacent links may not represent their precise true state at the instant that a routing decision is made. It is therefore possible that two or more intersecting routes selected independently by different modules will use the same uncommitted capacity data, thus potentially causing a scheduling collision. Reducing the time interval between successive uncommitted capacity information updates naturally reduces the probability of scheduling collisions. Consequently, a source module that selects a route based on uncommitted capacity data respecting a non-adjacent link preferably sends a routing confirmation request to the neighboring module in the route to ensure that the uncommitted capacity of its link to the sink module is sufficient to accommodate the connection or path. If the routing processor 94 receives a negative reply to the routing confirmation request, the routing processor 94 may reject the connection admission request. Alternatively, the routing processor 94 may attempt an alternate route, possibly outside the specified route set, having adequate uncommitted capacity to serve the connection, and send a routing confirmation message to the neighboring module in the route. Having available the near-true-state data for at least two alternate routes besides a direct route for which true-state information is available, connections can be successfully routed using the fast routing method most of the time.

UTM Connection Management

As described above, all traffic transferred through the UTM network is transferred using rate-regulated connections or paths. A connection management policy is therefore required in the UTM network 70.

Figure 17:
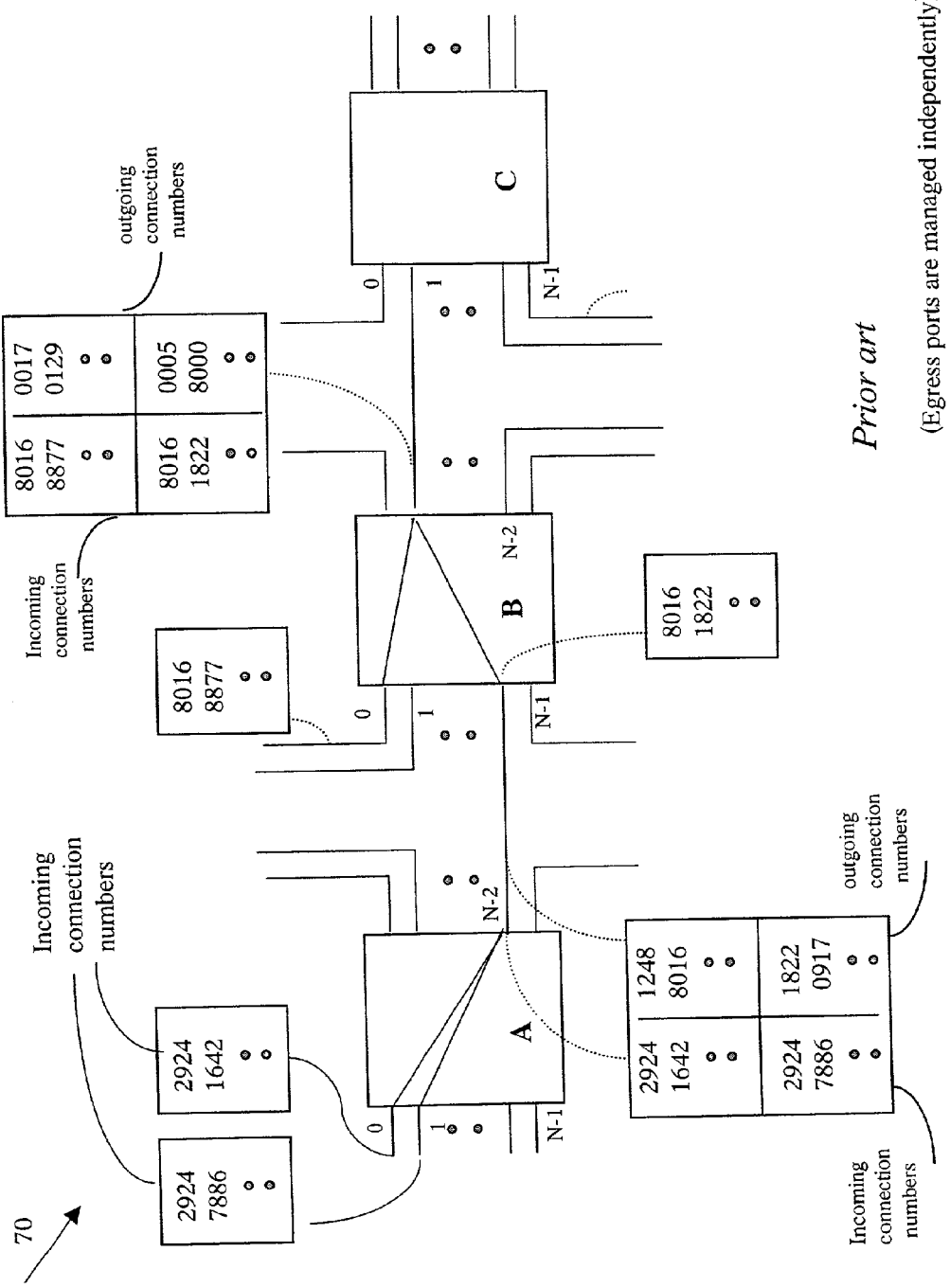
FIG. 17 is a schematic diagram showing a prior art method used in the UTM network for managing path or connection numbers.

FIG. 17 is a schematic diagram summarizing how path numbers and connection numbers are exchanged across the UTM network 70. An efficient method for threading multiple independent routes through a network is used in the ATM protocol, but has its roots in TDM voice communications where time slot exchanges occur several times as a call traverses the Public Switched Telephone Network (PSTN). A similar method is used in the UTM protocol. In the example shown in FIG. 17, connections cross three UTM modules A, B, and C, and the connection number exchanges for connections that cross modules A and B are illustrated. In module A, ingress port 0 has assigned numbers 2924 and 7886 to connections to be routed through egress port N–2 of module A. Ingress port 1 has independently assigned connection numbers 2924 and 1642 to connections that are also to be routed through egress port N–2 of module A. The packets bearing these numbers in field F9 (FIG. 1a) are queued in a buffer associated with the egress port N–2. Because it is anticipated that the incoming connection numbers may include duplicates, egress-port N–2 uses a simple translation process that assigns new connection numbers. From a pool of available numbers, the controller for egress port N–2 sequentially assigns an available egress connection number for each waiting packet in the egress buffer belonging to a new connection. The assigned connection numbers are removed from the number pool. The numbers selected from the pool are unlikely to be consecutive, even if they were initially stored as consecutive numbers in the pool. This is because the numbers selected from the pool are released after usage intervals of different duration as paths or connections are deleted.

Figure 18:
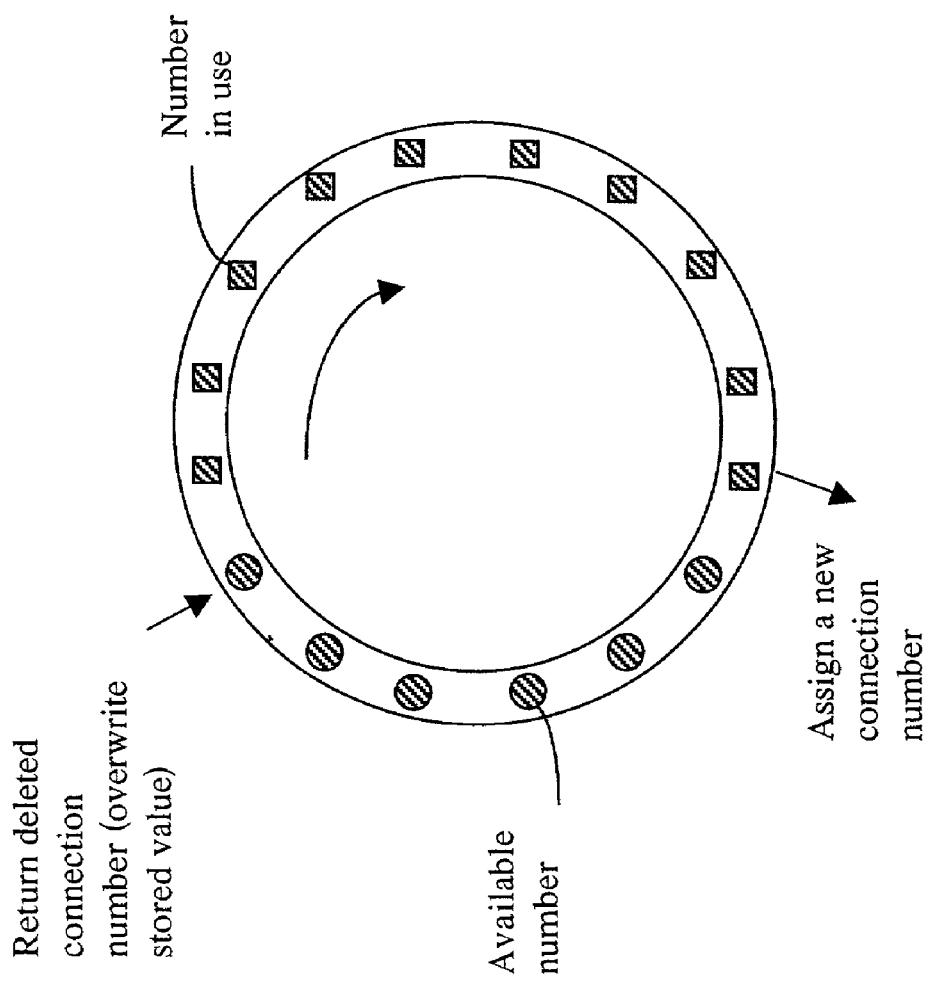
FIG. 18 is a schematic diagram showing a prior art method used in the UTM network for egress connection number assignment.

FIG. 18 schematically illustrates the process of selecting available connection numbers from the pool of numbers. This process takes place at each egress port in each module and at local ingress ports in source modules. The numbers are integers arranged in a circular array. Initially, the numbers in the array would normally, though not necessarily, be stored in an ascending order, starting with zero. As a number is assigned to a new connection, the number is overwritten with a null value, indicated by the square symbols in FIG. 18. A read-pointer is then advanced to the next connection number. When another connection number is required, the number indicated by the read-pointer is selected and that number is likewise overwritten by the null value. When a connection is deleted, the connection number is returned to the pool. A write-pointer is used to point to the location in the array where the free connection number is returned. The write-pointer is advanced one step with each returned number, the corresponding entry in the array should have a null value and the returned number overwrites the null value. An error condition should be flagged if the entry to be overwritten is not a null. This is the only reason for replacing a number taken from the array by a null. The numbers in the pool consequently are likely to become non-consecutive, even if the pool was originally a list of consecutive numbers, because they are returned to the pool after varying periods of use.

FIG. 19 shows an essential connection control table generally indicated by the reference 211 that is required at each ingress port of a UTM module 72. The table includes five rows and a number of columns that is equal to a combined maximum number of paths and connections permitted per link in the UTM network 70. A reasonable choice for the combined maximum number of paths and connections per link is 65536 (i.e., the largest number that can be stored in the word length of fields F9 or F11, which is preferably 16 bits). It should be understood, however, that the number of paths and connections is only limited by practical constraints. The word length of fields F9 and F11 can be increased to accommodate more paths or connections but control arrays become expensive if large numbers of connections are enabled. Table 127 is indexed by the connection/path number.

The first row 128 in table 211 contains the path number which is relevant only to connections within paths. The entries in row 128 that contain an "X" are paths or independent connections. The second row 129 contains the identification number of an egress port of the same module to which the path or connection is routed. Every active connection has an assigned egress port, as is seen in table 211. The third row 130 contains an egress queue number indicating an egress queue for a traffic stream to which the path, connection within a path or independent connection is assigned. The egress queue number is assigned by the module control element 85 which handles connection admission requests. When a path or an independent connection is set-up, it is assigned an egress port, which is determined by the route selection process. It is also assigned to a traffic stream and given an egress queue number, which is preferably determined by destination and class of service. When a connection within a path is set up, it inherits the egress port and egress queue number of the path. This permits the ingress port to immediately forward packets belonging to the connection to the appropriate egress port/queue with minimal route processing effort.

The fourth row 131 contains a number representative of a bit-rate reserved for a path or a connection. This number is normalized to a fixed maximum in order to maintain a consistent accuracy. For example, if each entry in row 131 has a word length of 20 bits, then about 1 million units represent the capacity of the egress channel (usually the entire egress link). The capacity of the path, or the equivalent bit rate of a connection, is then expressed as an integer between 0 and 1 million. The fifth row 132, contains the membership of each path, if any. Each time a connection that belongs to a path is created, the corresponding entry in row 132 is increased by one. Likewise, each time a connection belonging to a path is deleted, the corresponding entry in row 132 is decreased by one. The purpose of this column is to ensure sanity within the network. When a request is issued by an originating module to delete a path, the path membership must be verified to be equal to zero, i.e., all connections belonging to the path have been deleted. An erroneous deletion of a path that is still supporting a number of connections can lead to loss of the connections.

UTM Rate Regulation

Rate regulation is a challenge in a large scale multi-class network using variable size packets. In order to guarantee a specified service rate for each stream, payload traffic is preferably divided into separate streams, each traffic stream containing packets with similar service requirements. The traffic of each stream may wait in a buffer associated with the stream, and a service rate regulator samples each buffer to dequeue its head packet, if any, according to an allocated capacity (bit-rate) of its corresponding stream. One of the main requirements of the rate regulation is that the sampling interval, i.e., the mean period between successive visits to the same buffer, be close to the mean packet inter-arrival time to the buffer. Satisfying this condition reduces the packet delay jitter. This, however, is difficult to realize when numerous streams, hundreds for example, share the same resources and can not, therefore, be treated independently. This problem may be overcome using parallel processing and multi-stage sampling to permit eligible packets to be delivered to an egress link at link speed in an order and at a rate that avoid packet delay jitter and guarantees service commitments.

Rate regulation in the UTM network is the sole responsibility of egress controllers 88 (FIG. 7) after connection admission is completed. The ingress controllers 87 are payload packet receivers that receive incoming payload packets from ingress links, parse their adaptive headers and forward the packets through the switch fabric 86 to egress controllers 88. Each connection admitted to the UTM network is assigned to a traffic stream by the connection admission process. A traffic stream may represent a destination module, a class of service, or both. Each traffic stream is assigned an egress queue number (FIG. 19, row 130). When a connection is admitted and assigned to a traffic stream, a transfer rate allocation for the traffic stream, expressed in data units per interval, hereinafter referred to as "transfer credits", is updated by the module control element 85 to reflect the addition of the new connection. The updated transfer rate allocation for the traffic stream is then downloaded to an egress controller 88 (FIG. 7) that controls a link on which the new call is transferred. The egress controller 88 uses the transfer rate allocation for each traffic stream to control packet emission on the link(s) it controls, as will be explained in detail below.

Figure 20:
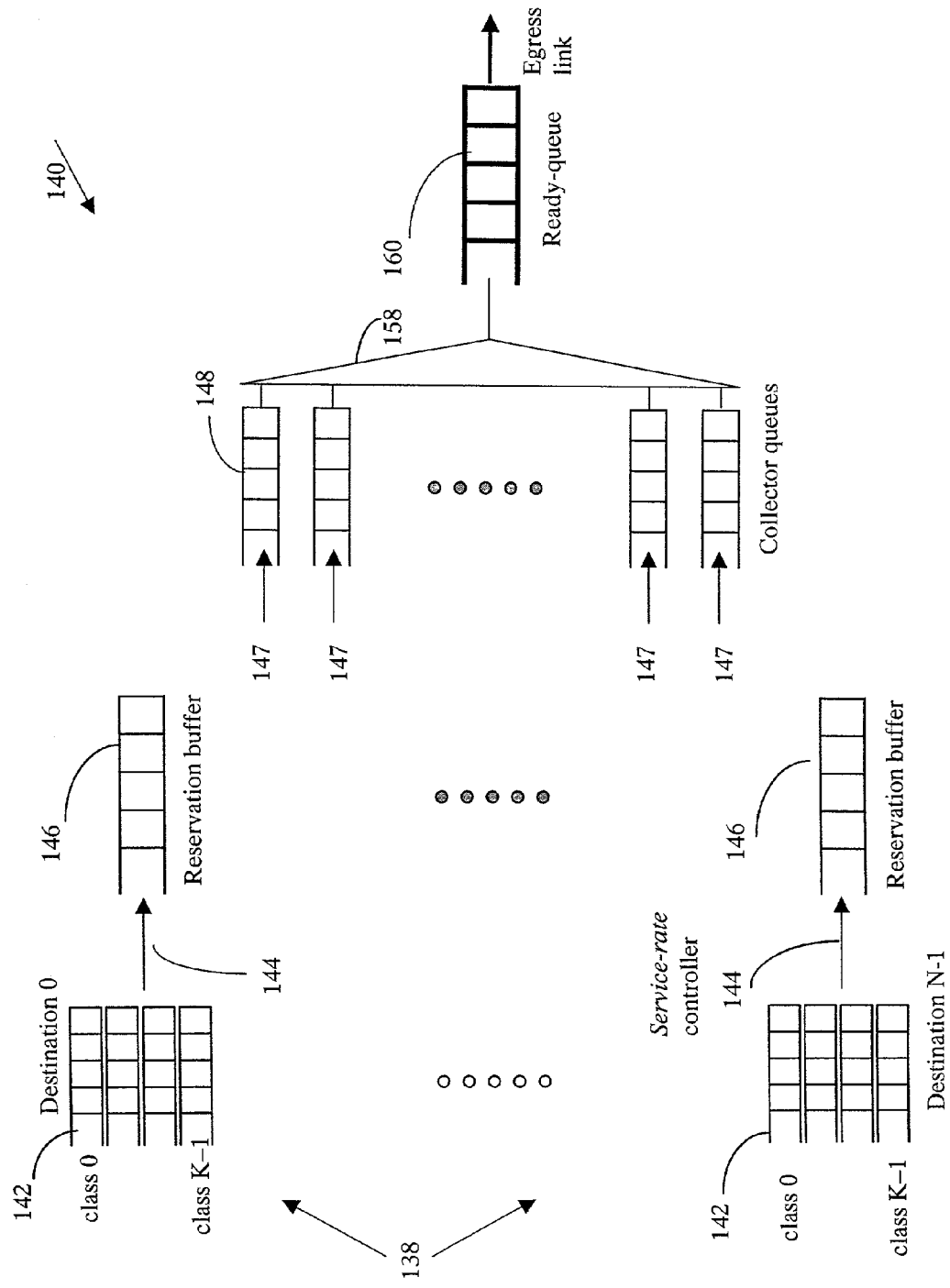
FIG. 20 is a schematic diagram of an overview of a packet scheduler at each egress link of a UTM module in accordance with the invention.

FIG. 20 shows an overview of a variable packet-size scheduler 140 in accordance with the invention. The packet scheduler 140 is a four-stage egress control circuit designed to eliminate link contention and guarantee rate control. A first stage consists of egress queues 142 which accommodate packets belonging to traffic streams preferably sorted by destination and class of service, although other sort criteria can also be used. Packets are moved from the egress queues 142 by a bank of rate controllers 144 to reservation buffers 146 in accordance with accumulated transfer credits by a service rate controller circuit described in applicant's co-pending United States patent application filed May 1, 1998, entitled METHOD AND APPARATUS FOR DISTRIBUTED CONTROL OF MULTI-CLASS NETWORK, the specification of which is incorporated by reference.

In a second stage, packets are moved from the reservation buffer 146 in which packets to be transferred are consolidated by destination, to collector queues 148, as will be explained below in detail. From the collector queues, packets to be transferred are moved to a ready queue 160 by a ready queue selector 158. From the ready queue 160 the packets are transferred to the egress link. Under certain circumstances that will be explained below with reference to FIG. 24, a fast transfer unit 150 is used to determine which packets will be transferred from a collector queue 148 to the ready queue 160.

When incoming packets are received by an egress controller 88 (FIG. 7) a packet queuing mechanism 138 sorts the incoming packets according to their traffic stream memberships (egress queue number—FIG. 19). The number of traffic streams can be arbitrarily large. The incoming packets of all streams are normally stored together in a storage facility that may be a single memory or an array of memories. However, packet pointers (not shown), which include an address indicating where a particular packet is stored in the storage facility and a length in bytes of that packet, are written in S=K×N egress queues 142, each of the egress queues 142 corresponding to one of the traffic streams. FIG. 20 shows N destinations with K quality-of-service classifications per destination.

A transfer rate allocation assigned to each traffic stream determines a rate at which packets from the respective traffic stream are to be transferred. As explained above, the module control element 85 preferably performs the function of determining the respective transfer rate allocations. However, as will be understood by those skilled in the art, the transfer rate allocations may be performed by an admission-control process, a real-time traffic monitoring process, or any other process for distributing link capacity among a plurality of classes of service. A service rate controller 144 uses the transfer rate allocations to determine an order and a proportion of time in which packets from the individual logical egress queues 142 are transferred, as described in applicant's co-pending application referred to above.

The UTM packet scheduler 140 in accordance with the invention is adapted to handle packets of variable size, as well as a large number of traffic streams. If a particular traffic stream is allocated R bits per second by the admission controller in 85, the number of bits eligible to be transferred from the traffic stream in a cycle of duration T seconds is R×T. If R=40 megabits per second and T=50 μsec, the number of bytes eligible to be transferred from the traffic stream each cycle is 250. In order to avoid packet jitter, the cycle duration T should be as short as possible. If the rate regulator is to handle 500 streams, for example, then realizing a 50 μsec cycle requires a processing time per stream of the order of 0.1 μsec. Consequently, two features are required to provide an acceptable UTM packet scheduler 140. First, transfer rate allocations unused in any cycle must be appropriately credited to the traffic stream for use in a subsequent cycle if there are packets in the traffic stream waiting to be transferred. Second, when there is a large number of traffic streams, the interval T is preferably kept small using parallel processing to increase the rate at which traffic queues are sampled for packets eligible for transfer.

Figure 21:
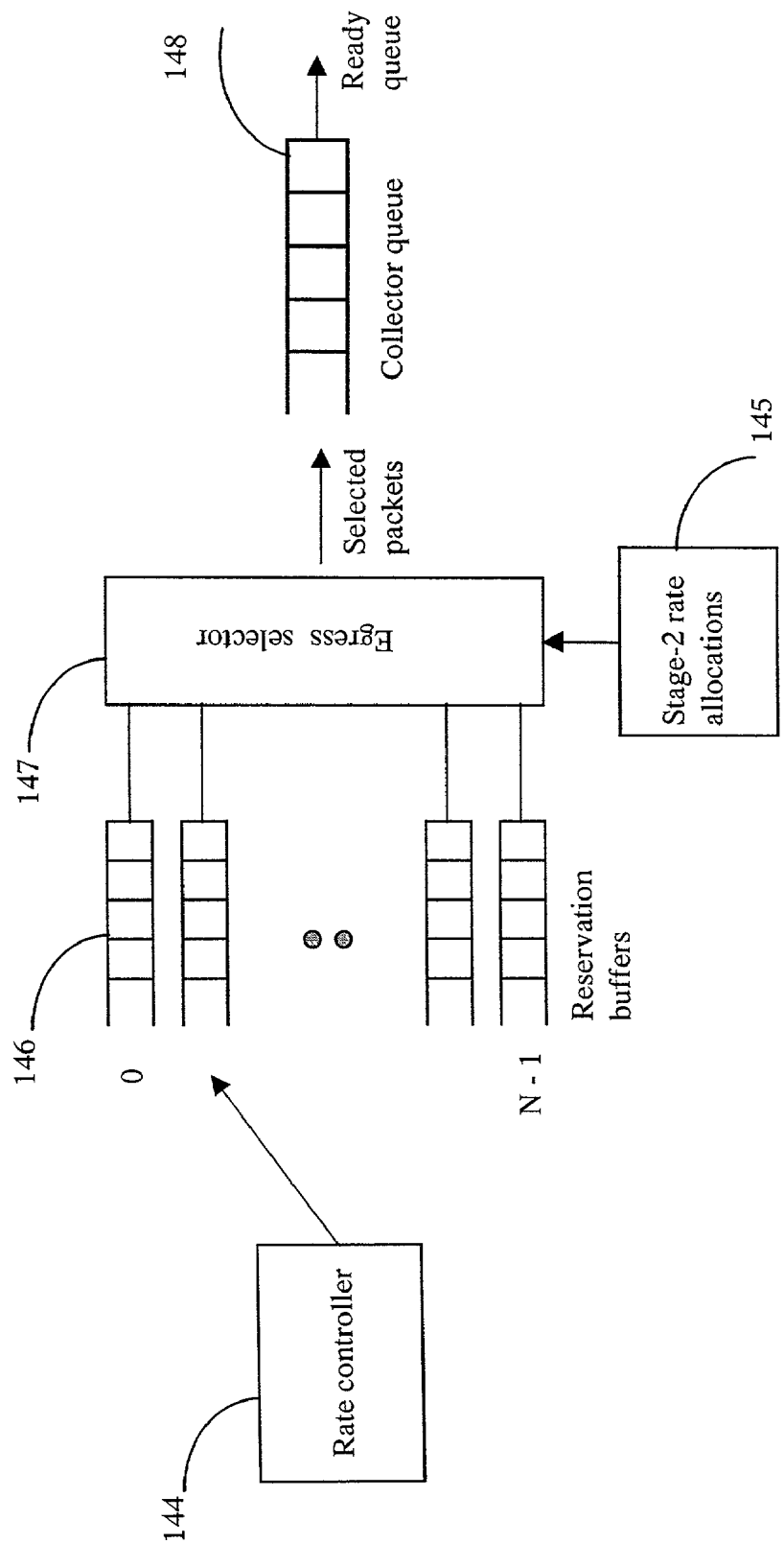
FIG. 21 is a schematic diagram of an egress selector of the packet scheduler shown in FIG. 20.

FIG. 21 shows a more detailed view of an egress selector 147 shown in FIG. 20. The egress selector 147 receives stage-2 rate allocations 145 (FIG. 21) for each destination N and uses them to select packets from the reservation buffers 146 in accordance with a transfer rate entitlement for a destination stream. In order for the egress selector 147 to perform the packet selection, a number of arithmetic operations are required. The packet scheduler 140 therefore includes a plurality of egress selectors 147 which work in parallel, as shown in FIG. 20.

Figure 23:
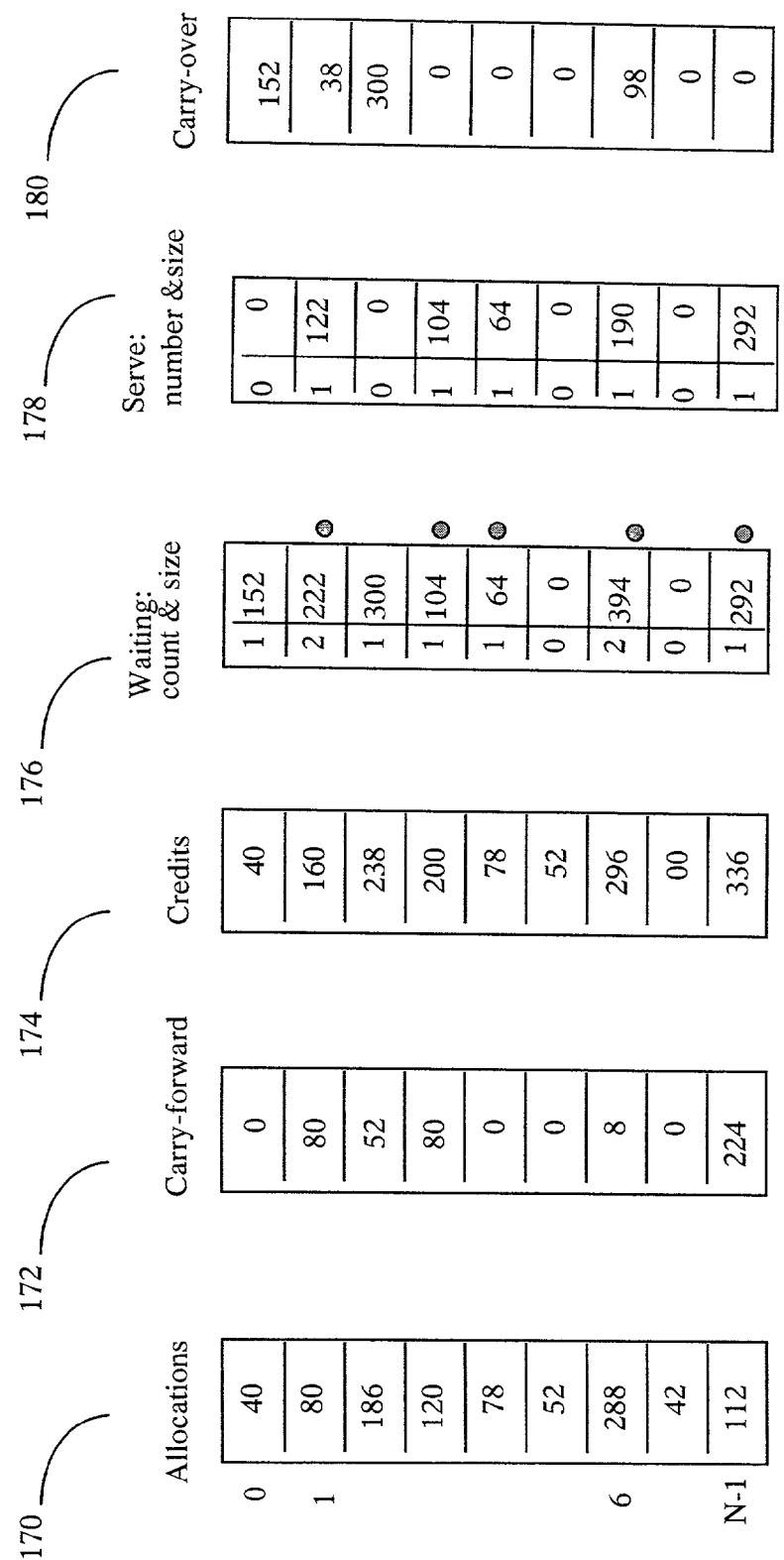
FIG. 23 is a diagram showing the arrays of FIG. 21 after one transfer cycle.

Each of the egress selectors 147 maintains data respecting traffic streams to be transferred, the data being schematically illustrated as a plurality of memory arrays shown in FIG. 22. The memory arrays include an array 170 for storing the stage-2 rate allocations 145. Each entry in the array 170 stores a number of transfer credits, in data units expressed in bytes for example, to which the traffic stream in a reservation buffer 146 is entitled in the predetermined time interval T. Another array 172 stores transfer credits (if any) carried over from a previous cycle, and an array 174 stores the total transfer credits currently belonging to each traffic stream. Another array 176 shows the number of waiting packets in each reservation buffer 146 and their combined size in bytes, or any other predetermined data unit selected to represent a transfer credit. The results of the rate regulation procedure are given in arrays 178 and 180 (FIGS. 22 and 23). Array 178 shows the number of packets to be transferred during a cycle "x" (time interval T) and the combined size of the packets to be transferred. Another array 180 shows a carry forward from cycle x to cycle x+1. Note that arrays 178, and 180 are shown for the purpose of illustration only. No corresponding physical arrays are necessarily maintained in the circuitry of the packet scheduler 140.

Each row in the arrays shown in FIG. 22 corresponds to a reservation buffer 146. During each time interval T, each reservation buffer 146 is visited once by one of the egress selectors 147. If the accumulated transfer credit in array 174 exceeds the total size of all waiting packets in a given reservation buffer 146, all of the packets are transferred to a collector queue 148 (FIG. 20) and the transfer credits for that reservation buffer 146 are set to "0". On the other hand, if the total size of the waiting packets exceeds the accumulated transfer credit 174, all of the packets in the queue cannot be transferred. Therefore, only a certain number of the waiting packets are transferred to the collector queue 148. The combined size of those packets cannot exceed the accumulated transfer credit 174, and any remaining transfer credit is retained for potential use in a subsequent cycle. In other words, the difference between the accumulated transfer credit 174 and a total size of the packets transferred to the collector queue 148 is carried over to the subsequent cycle.

There is a one-to-one correspondence between the traffic streams and the egress queues 142 (FIG. 20), so that egress queue j is associated with traffic stream j, and vice versa, 0≦j<S, S being the number of streams. There is a many-to-one relationships between the egress queues 142 and the reservation buffers 146. As explained above, each reservation buffer preferably accumulates all packets having a common destination. FIG. 22 illustrates an example of 9 reservation buffers 142 with the allocations in array 170, determined by the stage-2 rate allocations 145. For a given cycle "x", packets in the reservation buffer 0 are entitled to 40 bytes per cycle (40 transfer credits), packets in the reservation buffer 1 are entitled to 80 transfer credits per cycle, etc. Transfer credits in the carry forward array 172 have been accumulated from previous cycles, as explained above. A carry forward of zero indicates that the corresponding reservation buffer has been emptied (all packets transferred) and, consequently, remaining transfer credits, if any, were discarded. A carry forward from the previous cycle that is equal to the allocation for a given reservation buffer is likely to be caused by a waiting packet having a size that exceeds the allocation per cycle. Therefore, the transfer credits of the previous cycle was carried forward.

In the example shown in FIG. 22, reservation buffer 0 has an allocation of 40 transfer credits and the carry forward from the previous cycle is 40 transfer credits. The total transfer credit is 80 and there is a waiting packet of 78 bytes. The packet is transferred (the packet pointer is sent to a collector queue 148) and the remainder of 2 transfer credits is discarded because the reservation buffer 104 for destination 0 is empty. Reservation buffer for destination 1 has an allocation of 80 bytes with no carry forward from the previous cycle. A packet of 122 bytes is waiting. The packet is not transferred due to insufficient transfer credits, and is left in the reservation buffer for destination 1. The transfer credit of 80 bytes is carried forward for use in a subsequent cycle.

The reservation buffer for destination 2 has an allocation of 186 bytes, and a carry forward of 186 bytes from the previous cycle. The total credit of 372 bytes is less than the total size of the two waiting packets. A first of the two packets has a size of 320 bytes and can be transferred (sent to collector queue 148). The remaining transfer credit is now 52 bytes (372–320) and is carried forward to the next cycle since there is still a packet waiting in the reservation buffer for destination 2. The size of the remaining packet is 300 bytes. Destination 3 has a transfer rate allocation of 120 transfer credits, and there is a transfer credit of 120 bytes carried forward from the previous cycle. The total transfer credit of 240 bytes is less than the total size of the two packets waiting in the reservation buffer for the destination 3. The first packet is 160 bytes long and is therefore transferred. The remaining packet of 120 bytes remains in reservation buffer for traffic stream 3. The unused transfer credit of 80 (240–160) is carried forward for use in a subsequent cycle. Destination 4 is allocated 78 transfer credits per cycle and it has no carry forward transfer credit from the previous cycle. As indicated in array 176 (FIG. 22), there are no waiting packets in the reservation buffer for destination 4, so the transfer credits are discarded. The transfer credits for destination 5 is treated in the same way because no packets are waiting in the reservation buffer 142 for that destination. The destination 6 has a transfer rate allocation of 288 transfer credits per cycle, and no transfer credits were carried forward from the previous cycle. There are five packets waiting in the reservation buffer for destination 6. The packets have a combined size of 470 bytes. When the combined size of the waiting packets exceeds the accumulated transfer credits. The destination 7 has a transfer rate allocation of 42 transfer credits with no transfer credits carried forward from the previous cycle. There are no waiting packets in queue 7 and the transfer credit of 42 bytes is discarded. Finally, the destination 8 has a transfer rate allocation of 112 transfer credits and 112 transfer credits were carried forward for a total transfer credit of 224 bytes. The waiting packet is 292 bytes long and is therefore not transferred (not moved to the collector queue 148) due to insufficient transfer credits. The transfer credit of 224 bytes is carried forward for use in a subsequent cycle.

FIG. 23 shows the same arrays as shown in FIG. 23 for the same destinations 0 through 8 after a time interval T (cycle x+1). During cycle x+1, two packets were added to the appropriate reservation buffers 146. Of those two packets, a first packet of 100 bytes was placed in the reservation buffer for the destination 1, and a packet of 208 bytes arrived during the interval T and was placed in the reservation buffer for destination 6. The reservation buffer for destination 1 now stores two packets having a combined size of 222 bytes (122+100) as shown in array 176 of FIG. 23, and the reservation buffer for destination 6 now stores two packets having a combined size of 398 bytes (190+208). The same rules described above are applied during the cycle x+1 and the results at the end of that cycle are shown in FIG. 23.

The operations required to transfer variable length packets in this rate-regulated way, requires that N arithmetic calculations be performed during each cycle, N being the number of streams to be rate regulated. Those arithmetic calculations involve additions in which the transfer credits carried forward for reservation buffers are added to the allocation for the reservation buffer, when appropriate, as described above. If the number of reservation buffers is large, of the order of 1000 for example (i.e., the network has about 1000 nodes), then a cycle having a long duration is needed in order to perform all of the arithmetic calculations required. Since cycles of long duration contribute to packet delay jitter and other undesirable effects, a number of adders are preferably used in parallel to update the total transfer credits at an end of each cycle. Parallel adders may be used because the transfer credits for the different reservation buffers are independent and can be updated independently. Using 16 adders for example, with each adder dedicated to 64 reservation buffers 146, the transfer credit update time for 1024 reservation buffers would be about 6.4 μsec, assuming the time per addition to be 0.1 μsec.

The transfer of a packet from a reservation-buffer 146 to a collector queue 148 (FIG. 20) usually requires subtracting a size of the packet from the accumulated transfer credits for the traffic stream, as also described above. In order to permit the credit for each traffic stream to be updated within a cycle of acceptable duration, parallel adders respectively dedicated to a subset of the reservation buffers are also used in the packet scheduler 140 in accordance with the invention. However, if the volume of traffic in the respective traffic streams varies significantly (i.e., there is at least one very high bit rate connection in the traffic stream), that single traffic stream may require more computations than can be performed by a single adder within a single time interval T. In other words, packets to that destination may require a much higher rate of packet transfer to a collector queue 148 (FIG. 22) than packets addressed to other destinations in a subset of reservation buffers 146 handled by an adder in a group of parallel adders. Under these unusual circumstances, the use of dedicated parallel adders does not help to reduce the overall update time. The reason is that the transfer of numerous packets from the same stream can not be done independently. The decision to transfer or retain a packet in the second position in a reservation buffer can only be made after the remaining credit is updated with the transfer of the packet in the first position of the reservation buffer.

For example, if a packet addressed to a particular destination module requires most of the capacity of an egress link having a total capacity of 10 Gb/s, a problem arises. If each of the packets in the reservation buffer 146 that serves that destination is about 64 bytes long, during a cycle of 6.4 microseconds the adder assigned to that reservation buffer would have to perform 125 operations, each operation requiring subtraction, memory updates, etc. In the meantime, the other parallel adders might be completely idle. Nonetheless, the arithmetic operations associated with the transfer of successive packets from a given traffic stream must be handled by the same adder because each step requires the result of the previous step. The reservation buffers are preferably divided into a small number of subsets, four subsets for example, and an egress selector 147 is dedicated to each subset as described above and shown in FIG. 20. When, occasionally, the streams associated with any reservation buffer 146 use a large proportion of the egress link capacity, the egress selector 147 should be able to perform the transfer of packets in an interval which is substantially shorter than the desired cycle duration T. The partitioning of the reservation buffers 146 into subsets for the purpose of egress transfer need not be related to the traffic stream partitioning for the purpose of transfer credit accumulation computations. The only requirement is that the egress transfer process for any reservation buffer 146 be performed after the credit accumulation for the reservation buffer is completed.

The calculations associated with egress transfer may not be required. This occurs in the cases where (1) there is a single waiting packet for a given traffic stream or (2) when the transfer credits of the traffic stream exceeds the total size of the waiting packets. The cumulative packet size is updated with each packet arrival and each packet departure. This must be done for two purposes. First, in order to determine the number of packets that can be transferred. Second, the cumulative packet size may be needed to calculate a transfer credit to be carried forward for use in a subsequent cycle. A transfer credit is calculated only if the cumulative packet size exceeds the available credits and not all the waiting packets are dequeued.

Figure 24:
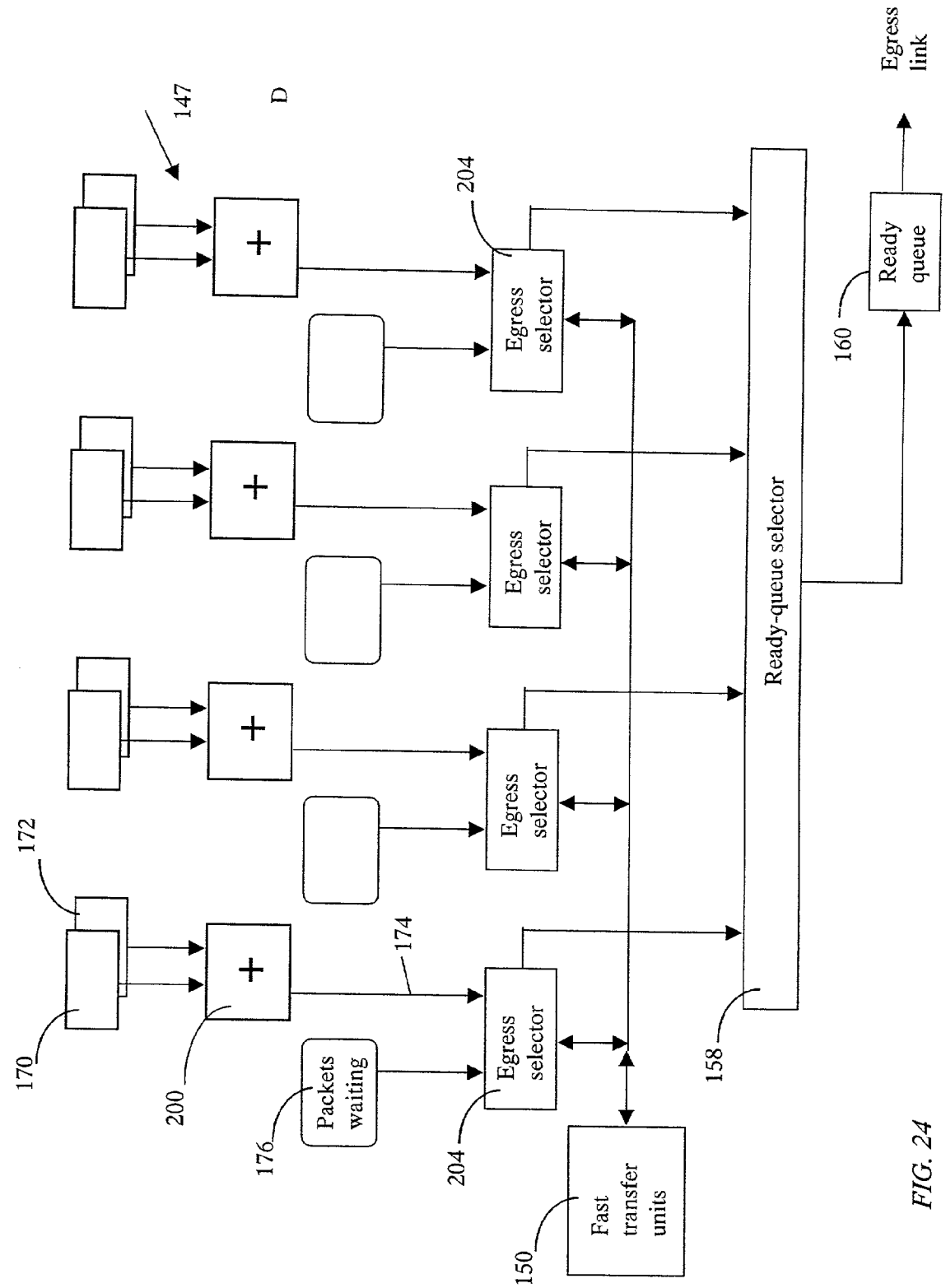
FIG. 24 is a schematic diagram showing a more detailed view of the egress selector shown in FIG. 21; and a fast packet transfer unit which assists the egress selector in certain operations.

Four egress selectors 147 are shown in more detail in FIG. 24. Each egress selector 147 includes an adder 200 and an egress selector circuit 204. Each of the adders 200 is dedicated to a subset of the traffic streams. The adders operate independently. The transfer credit allocation 170 per reservation buffer and the carried forward transfer credit 172 from the previous cycle are added in adder 200 to produce the updated transfer credits 174 which are transferred to the egress selector circuit 204.

The egress selector circuit 204 receives the list of the waiting packets 176 (FIG. 22) which includes an accumulated size of the waiting packets. The accumulated size is compared with the updated transfer credit output by adder 200. If the accumulated packet size is zero (no waiting packets), the transfer credit for that reservation buffer is set to zero. If the size of the first packet in the reservation buffer is larger than the accumulated transfer credit 174, nothing need be done and the accumulated transfer credit 174 remains unchanged. If there is only one packet waiting in the reservation buffer and it is smaller than the accumulated transfer credit 174, the packet is transferred to the collector queue 148, which is preferably a port of the egress selector circuit 204, and the accumulated transfer credit 174 is set to zero. If two or more packets are waiting, the accumulated size of the waiting packets and the accumulated transfer credit 174 are compared. If the accumulated size of the waiting packets is less than the accumulated transfer credit 174, all packets are transferred to the collector queue 148 and the accumulated transfer credit is set to zero. If the accumulated size of the waiting packets exceeds the accumulated transfer credit, the packet pointers are copied to a fast transfer unit 150, as will be explained below. The number of egress selector circuits 204 is preferably equal to the number of adders 200.

The number of fast transfer units 150 may be substantially less than the number of egress selector circuits 204. If so, the egress selector circuits share a smaller number of fast transfer units 150. A selector link feeds the lists of waiting packets from the egress selector circuits 204 to a fast transfer unit 150. The fast transfer unit 150 computes the number of packets eligible for transfer from each list before the end of the time interval T, as will be explained below in some detail. Thus, the function of the fast transfer units 150 is to determine the number of packets eligible for transfer from a reservation buffer 146 to a collector queue 148 when the accumulated size of the packets to be transferred exceeds the accumulated transfer credits. It is noted that if the packet size is a constant, the fast transfer unit would not be needed and can be replaced by a simple counter.

Figure 25:
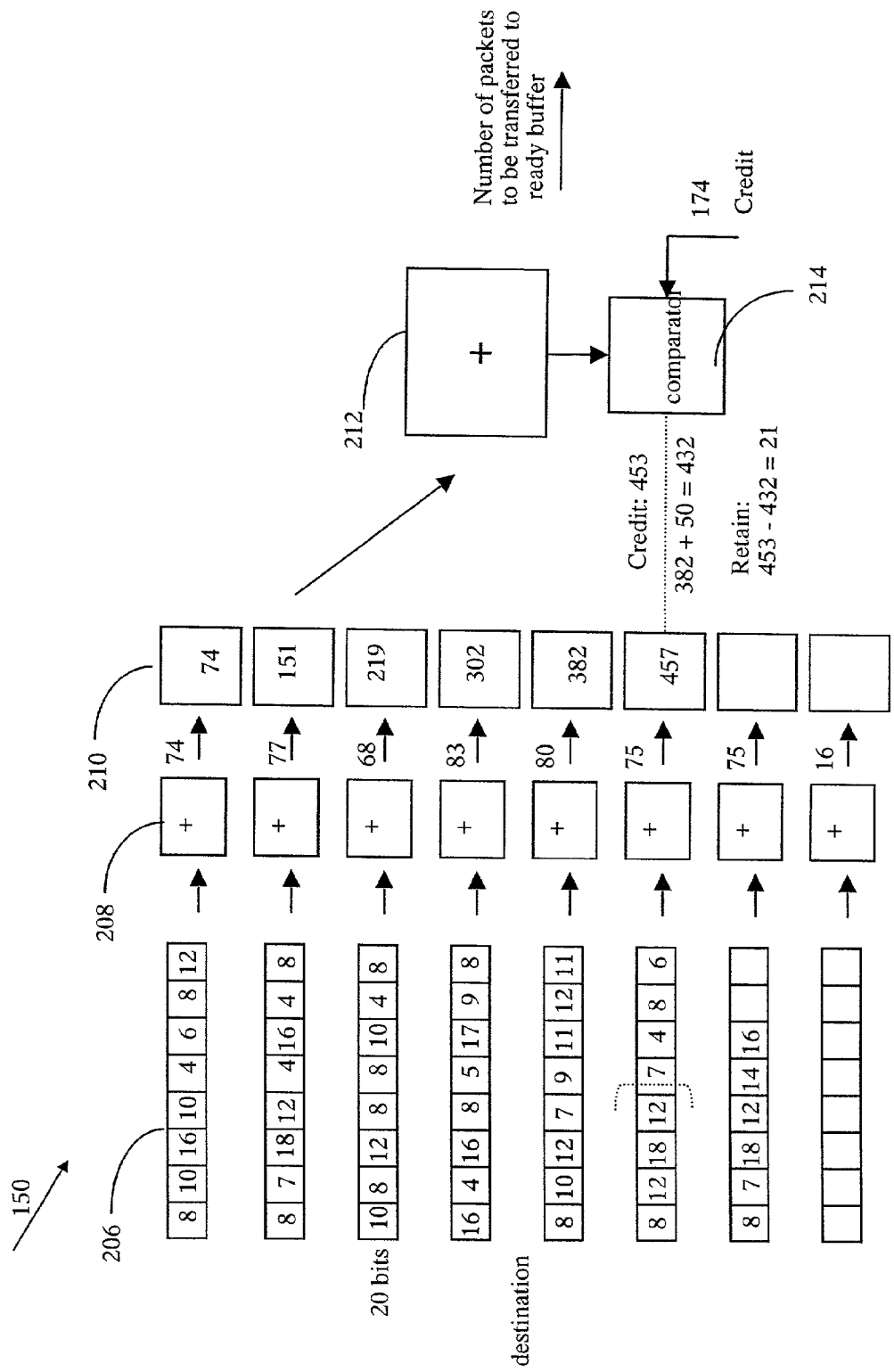
FIG. 25 is a schematic diagram illustrating the operation of the fast packet transfer unit shown in FIG. 24.

FIG. 25 illustrates the operation of the fast transfer unit 150. The fast transfer unit 150 is preferably adapted to examine up to 64 packet pointers at a time for packets waiting in a reservation buffer 146. When there are more than 64 waiting packets, only 64 would be examined and the remainder would wait for the next cycle. A length of each of the waiting packets is stored in eight parallel memories 206. Each of the memories 206 have a capacity of eight words. Each eight-word memory is associated with an adder 208 that accumulates the lengths of the waiting packets.

After all eight of the memories 206 have been summed the results are copied to memory 210. An adder 212 accumulates a sum of memory 210 starting from the top word where the cumulative length of the first eight packets are stored. As each word of memory 210 is added to a sum accumulated by adder 212, the sum is compared with the accumulated transfer credit by a comparator 214. The addition process by adder 212 continues until the sum exceeds the accumulated transfer credit, or until the last positive value in memory 210 has been added to the sum (memory 210 is initialized with zero entries). When the sum accumulated by adder 212 exceeds the accumulated transfer credit after adding a word from the memory 210, the contents of the eight memories 206 are examined from right to left to determine the maximum number of packets that can be transferred to the collector queue 148. When the number of packets eligible for transfer has been computed, the fast transfer unit informs the egress selector circuit 204. The egress selector circuit 204 moves the eligible packets to the collector queue 148 and moves the remaining packet pointers to the head of the reservation buffer 146. The accumulated transfer credit 174 is then decreased by an amount equal to the cumulative size of the packets transferred.

The fast transfer unit 150 therefore permits an efficient transfer of packets to the collector queue 148 when packets addressed to one destination dominates the use of a link. The requirement to use a fast transfer unit 150 rarely occurs. One or two fast transfer units 150 in each packet scheduler 140 should generally suffice.

A ready queue selector 158 visits each collector queue in a cyclical rotation and transfers packets from the collector queues 148 to the ready queue 160. The purpose of the ready queue selector is to prevent write contention to the ready queue 160. From the ready queue 160, the egress controller transfers the packets to the egress link.

Provisional Connections

A connection within a path may either be rate regulated or unregulated, in which case it is served on a standby basis. If rate regulated, the connection is allocated a service rate which is based on traffic descriptors and admission control parameters, as explained above. This rate is guaranteed by the rate regulation mechanism. If the connection is unregulated, it may only use the uncommitted capacity of the path or the idle periods of the rate-regulated connections. As described above, connectionless traffic may be assigned unregulated connections, internally within the distributed switch in order to speed up the packet forwarding process.

When there are several unregulated connections within a path, all having the same origin and destination, they may be treated differently according to preferential service quality requirements, with each unregulated connection having its own QOS index. This is accomplished using any of the weighted queuing mechanisms known in the art.

The capacity of a path equals or exceeds the sum of the rate allocations of its individual regulated connections. When a path capacity is not sufficient to accommodate the unregulated traffic, the respective packets may wait indefinitely in the allocated storage or be discarded. In order to fully share the network transport resources, it is beneficial to explore the possibility of increasing the capacity of a path to accommodate waiting unregulated traffic. Increasing or decreasing the capacity of a path is one of the features of UTM as described with reference to FIG. 1a. Increasing the capacity of a path to accommodate unregulated traffic is done by creating a provisional regulated connection with an allocated service rate. The capacity increment is accomplished using the UTM protocol, with the agreement of both the originating module, the destination module and any intermediate modules. However, the capacity increment may be revoked, or reduced, if any of the modules in the path requires the capacity granted to unregulated traffic in order to accommodate new connection admission requests for regulated connections. The UTM protocol is then used to decrease the path capacity accordingly.

A provisional independent connection may also be established to accommodate unregulated traffic. However, the use of a provisional connection within a path is more efficient since such a connection would also be able to exploit the idle periods of regulated connections within the path.

Modifying the Capacity of a Provisional Connection

A provisional connection is established for a connectionless traffic stream for two purposes. The first is to speed up the transfer of packets at intermediate modules and therefore increase the UTM network throughput. The second is to enable the module's control elements 85 to provide quality-of-service when the network load conditions permit. A provisional connection is created for traffic streams which do not have a specified transfer rate. In fact, most connection-based connection admission requests are generally unable to specify a bit-rate requirement. The source may, however, specify a QOS parameter which is used for service level differentiation. Similarly, a connectionless packet may carry a QOS parameter, which is inherited by a corresponding provisional connection when it is created.

Connection-based traffic streams with unspecified transfer rates and connectionless traffic streams with provisional connections are called unregulated traffic streams. Unregulated traffic streams rely on provisional transfer rate allocations which can be modified according to the temporal and spatial fluctuation of the uncommitted capacity of a link. The capacity of a provisional transfer rate allocation is determined using two basic criteria: the number of packets waiting in a traffic stream, and the QOS of the traffic stream. The packets of unregulated traffic streams are sorted at the egress controller 88 of the source module 72 according to their respective QOS. The egress queue 142 (FIG. 20) is logically partitioned accordingly, each logical partition accommodating one traffic stream. A monitor circuit associated with each egress controller 88 examines the occupancy of each traffic stream, i.e., the number of data units waiting in each traffic stream, and determines an appropriate transfer rate for each unregulated traffic stream. The maximum number of unregulated transfer streams at an egress port in a given module equals the number of other modules in the UTM network times the maximum number of classes of service (typically 4). Thus, in a distributed switch of 128 modules, with four classes of service for unregulated traffic, the maximum number of unregulated traffic streams to be monitored is 508. Preferably, the provisional transfer rate allocations are determined for the aggregate unregulated traffic from each source module to each sink module. The differentiation according to class of service is applied at the source module.

Several methods can be devised to determine the provisional transfer rate allocation for each traffic stream. The preferred method is a hysteresis control method used to control the provisional transfer rate allocations, which is described below.

Hysteresis Control Method

The hysteresis control method requires that an upper bound and a lower bound for the number of waiting packets in a traffic stream be defined. If the number of waiting packets, hereinafter referred to as the "stream buffer occupancy" of a traffic stream buffer, is less than (or equal to) the lower bound, the traffic stream is defined to be in "zone 0". If the occupancy is higher than (or equal to) the upper bound, the traffic stream is defined to be in "zone 2". Otherwise, the traffic stream is defined as being in "zone 1". As described above, the traffic streams in the egress queues 142 are preferably sorted at each egress port in each module 72 according to destination and class of service. Thus, if the number of modules 72 in the distributed switch is 128, then rate-allocation changes are needed for maximum of 127 traffic streams, which is the maximum number of unregulated traffic streams at each egress port in the source module.

Figure 26:
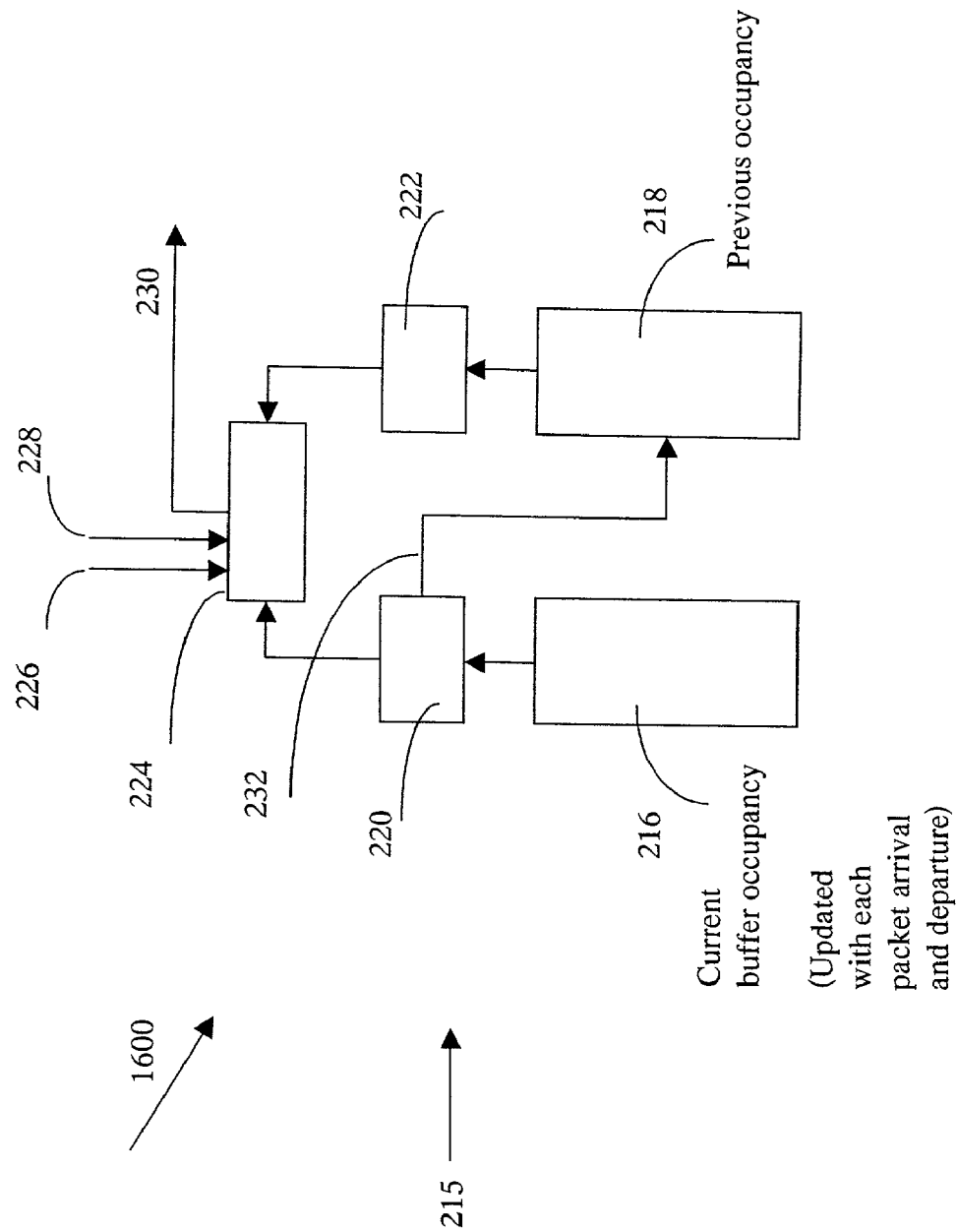
FIG. 26 is a schematic diagram of a hysteresis control circuit used for controlling provisional transfer allocations in a method in accordance with the invention.
Figure 27:
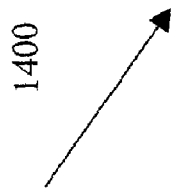
FIG. 27 is a table illustrating the outputs of the hysteresis control circuit shown in FIG. 26 for a single unregulated traffic stream.

The mechanism used to determine the provisional transfer rate allocations is based on periodically examining an occupancy of each traffic stream buffer. The examination of the occupancy of each traffic stream is preferably done at equally spaced time intervals. The occupancy is examined during each monitoring interval by inspecting a count of data units, bytes for example, accumulated by the rate controller 144 (FIG. 20). The count is updated by adding the length of each new arrival and subtracting the length of each departing packet. FIG. 26 shows a schematic diagram of a circuit 215 used for hysteresis control. A memory 216 stores the latest occupancy of each traffic stream buffer. Assuming a reasonable limit of 1 million bytes per buffer, the required width of memory 216 would be 20 bits. When a packet is added to a traffic stream buffer, the corresponding entry in memory 216 is increased by the packet length, and when a packet is transferred from a traffic stream buffer the corresponding entry in memory 216 is decreased by the packet length. An associated memory 218 stores the occupancy of each traffic stream at the immediately preceding monitoring interval. There is a one-to-one correspondence between the entries in memory 216 and those memory 218. The entries in memory 216 are read sequentially, one during each rate-update interval. A rate-update interval is the time taken to poll each stream and determine the required rate change. Each value read is transferred sequentially to a register 220. Simultaneously, the value read from memory 218 is transferred to a register 222. A transfer rate allocation circuit 224 receives the contents of registers 216 and 218. In addition, the transfer rate allocation circuit 224 has two virtually static inputs. One, 226 provides the upper and lower occupancy bounds and the other, 228, provides the value of the capacity increment $\Delta 1$ and the value of the capacity decrement $\Delta 2$. Each is a positive number. Allocation circuit 224 performs the following steps during each rate-update interval:

(1) Comparing the entry of register 220 with the upper and lower bound to determine the current zone 0, 1 or 2 of the traffic stream;

(2) Comparing the contents of registers 220 and 222. The outcome of this comparison is a "0" or "1". If the capacity has decreased, the outcome is "0". Otherwise, it is "1";

(3) If the zone is 2 and the result of the comparison done in step 2 is "1", then the output of circuit 230 is a "$+\Delta 1$";

(4) If the zone is 0 and the result of the comparison done in step 2 is "0", then the output 230 of circuit 224 is a "$-\Delta 2$";

(5) If neither of the conditions of steps 3 and 4 is met, the output 230 of circuit 224 is zero;

(6) Regardless of the result, the content of register 220 is written at the corresponding address of the traffic stream in memory 218, as indicated by arrow 232, to be used for the subsequent allocation decision. This is done once the entry at the address in memory 218 has been transferred to the register.

The rate-update interval, i.e., the interval between successive revisions of the transfer rate allocation for a given traffic stream, equals the polling interval multiplied by the number of traffic streams. For 128 traffic steams, for example, and a polling interval of 1 μsec, the rate-update interval is 128 μsec, which is considered adequate for a network of that size.

The rate-update interval should be sufficiently short to permit timely corrective action but sufficiently long to avoid unnecessary processing. The gap between the upper bound and the lower bound plays an important role in controlling the rate at which transfer rate allocation changes are made. The larger the gap, the lower the rate at which the transfer rate allocation changes. On the other hand, an excessively large gap may cause idle link resources. The upper bound is dictated by transfer delay requirements and/or limitations respecting the number of waiting packets that can be stored. Thus, increasing the size of the gap would be accomplished by decreasing the lower bound. This may result, however, in unnecessarily retaining unused transfer rate allocations.

Provisional Connections with Multiple QOS Streams

At a source module, the provisional connections established to a given sink module may comprise traffic of different QOS classification. The aggregate rate change for all the streams sharing the path from the source-module to the sink-module should be determined and only one request need be sent to the admission controller 85. The individual rates for each stream need only be known to the first-stage regulators at the source module. The occupancy of each stream buffer is determined at equally-spaced time slots. The desired increments or decrements of the rate allocation of each stream are aggregated. If the sum is close to zero, no request is sent. If the sum is negative, the sum is sent to the admission controller to enable it to allocate the gained free capacity to other paths. If the sum is positive, the admission controller may reduce the rate increment requested. It is also possible that the admission controller grant a higher rate than requested. In such case, the reduced aggregate allocation may be divided proportionately among the streams requiring rate increments. In any case, the local first-stage rate regulator must be given the individual rates of each stream.

Figure 28:
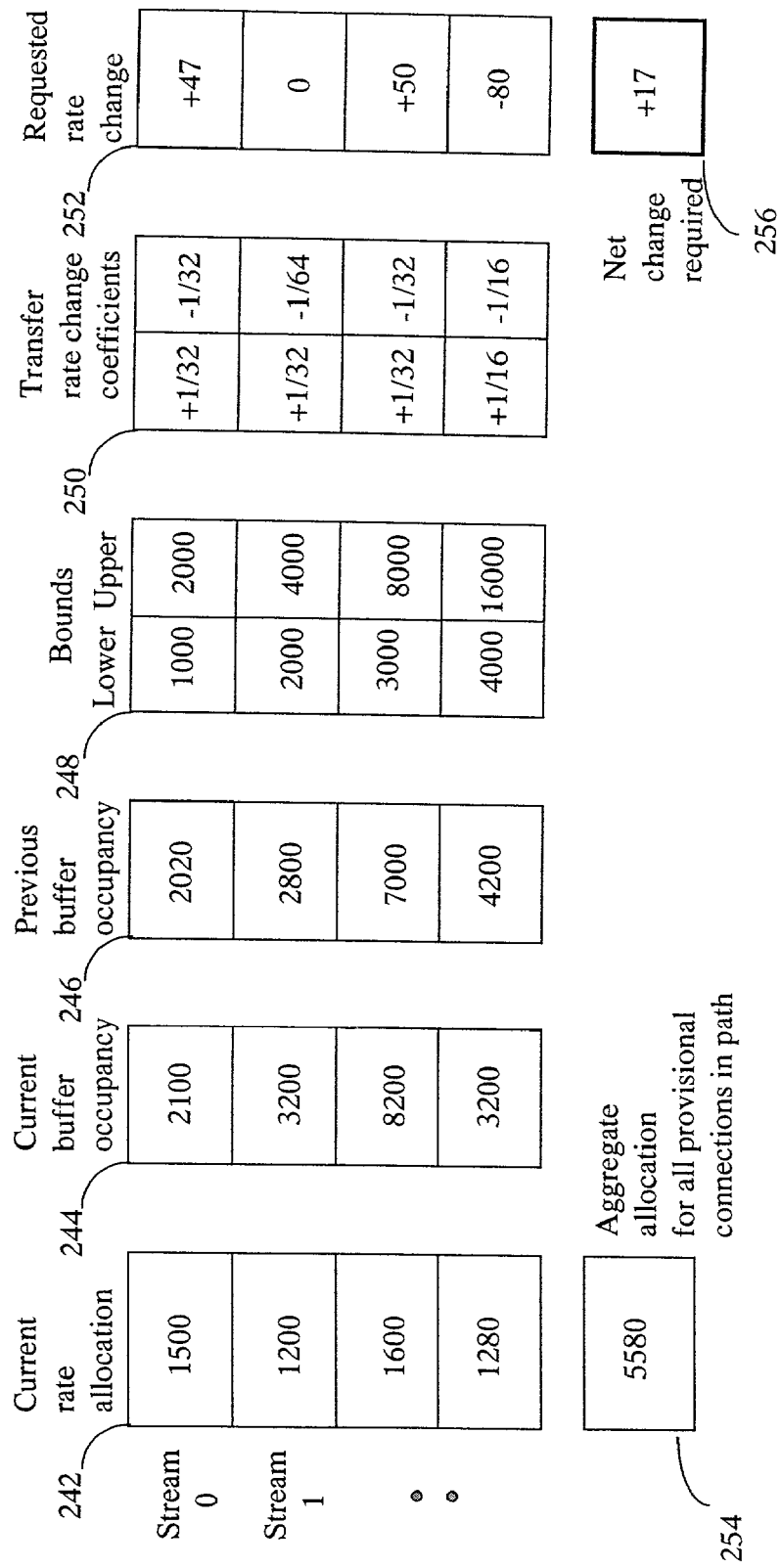
FIG. 28 is a schematic diagram showing an example of a calculation of required transfer rate changes for unregulated traffic streams.

FIG. 28 shows an example of four streams of unregulated traffic, possibly sharing a link with several other regulated streams. At a given observation instant, the shown unregulated streams have acquired provisional rate allocations for streams 0 to 3 represented by the values 1800, 1200, 1600, and 1280, respectively. Each of these numbers represents the actual rate, in bits per second for example, multiplied by the cycle duration of the rate regulator, and divided by the length of the predefined data unit. For example, if the allocated rate for a stream is 80 Megabits per second, T is 20 microseconds, and the data unit is a byte, then the allocation is 200 units. In FIG. 28, the allocations are stored in a "current-rate-allocation" array 242. The occupancy of each stream buffer, expressed in the same data units used in determining the allocations, is stored in the "current buffer occupancy" array 244, stored in memory 216. The "previous buffer occupancy" array 246, stored in memory 218, contains the occupancy of each stream buffer at the beginning of the immediately preceding monitoring cycle. In one implementation, at the beginning of each monitoring cycle, the contents of array 244 is copied in a "copy memory" (not shown). At the end of each monitoring cycle, the "copy memory" and "previous buffer occupancy" memory swap their roles. All of the above memories are zero initialized. It may be noted that the monitoring cycle is typically relatively long (one millisecond for example) and memory 244, the copy memory, and memory 246 can be combined in one memory. Another implementation of updating memory 218 is to replace the content of each entry transferred to the register 222 by the corresponding entry in memory 216.

Memory 248 stores the lower bound and upper bound for each unregulated stream. Memory 250 stores the relative rate-change coefficients for each unregulated stream. The preferred values of the coefficients in memory 250 are of the form of the inverse $j^{th}$ power of 2, i.e., $2^{-j}$, where j is an integer not exceeding 15. Thus, only the power j need to be stored, and with the value of j being less than 16, only four bits per coefficient are needed. The procedure depicted in the example of FIG. 28 is quite simple and can be extended to a large number of unregulated streams. The provisional allocations take place only at the source modules. An egress port in a source module may have a number of unregulated streams for each destination. A mechanization of the procedure of FIG. 28 may be used for each destination. However, since the monitoring cycle is usually relatively long, a single mechanism may be used to determine the required rate changes for the regulated streams of all destinations. The calculation of the requested rate change is fast since it uses j-bit shift rather than multiplication to determine the required transfer-rate change.

Virtual Private Networks

The UTM network is also adapted to be used for a variety of services besides those described above. For example, a Virtual Private Network (VPN) can be embedded in the UTM network. A VPN is formed as a number of paths with regulated capacities, and a number of switching units connected to the ingress side of selected modules 72 of the UTM network. The selected modules 72 for a given VPN are referred to as the host modules 72 of the VPN. A module 72 in the UTM network can serve as a host module for several VPNs. The regulated capacity of each path used by a VPN can be adaptively modified in response to changing traffic loads.

A VPN may adopt either of two schemes for managing its traffic. In a first scheme, the management of the individual connections within a path in a VPN is the responsibility of the VPN switching units subtending to the host modules. The host module 72 treats the traffic from each VPN as a distinct traffic stream with a guaranteed transfer rate, i.e., with a guaranteed path capacity. Thus, a module 72 supporting several VPNs must separate the respective traffic streams at the egress queue 142 in packet scheduler 140. As described above, the egress selector 147 distinguishes traffic only by destination in order to facilitate the scalability of the UTM network to a very-high capacity. The inter-working of the egress selector 147 and the fast transfer unit 150 in the egress controller 88 of each module 72 in the UTM network ensures both capacity scalability and quality of service distinction among a potentially large number of individual traffic streams.

In the second scheme, the VPN may use the traffic management capability of the host module 72. However, the VPN may establish its own standards and definitions of quality of service. For example, a VPN identified as VPNx may choose a weighted priority scheme for its traffic classes, while another VPN, identified as VPNy, which shares some or all of the host modules 72 of VPNx, may use a guaranteed minimum transfer rate for each of its individual classes. The guaranteed minimum transfer rate option is described in U.S. patent application Ser. No. 09/071,344 to Beshai et al. filed on May 1, 1998. A host module 72 that supports a number of VPNs with different requirements and quality-of-service definitions must be equipped with more egress queues 142 and rate controllers 144 to handle the required number of traffic streams. In general, permitting each module 72 to establish its own traffic management rules facilitates sharing of the UTM network by a variety of service subscribers and accommodates VPNs with different service requirements.

The embodiments of the invention described above are exemplary only. Changes and modifications to those embodiments may become apparent to persons skilled in the art. The scope of the invention is therefore intended to be limited solely by the scope of the appended claims.

I claim:

1. A method and a network for a universal transfer mode (UTM) for data transfer in a data network that transfers variable length payload data packets comprising:

an adaptive header that is parsed to interpret a purpose and a destination for each packet transferred within the data network, the payload packets being appended to the adaptive header to effect the transfer of the payload packets through the data network, and the adaptive header being used alone as a control packet for control messages exchanged in the data network, transferring payload data packets as connectionless packet traffic wherein the adaptive header is used to distinguish a connectionless payload packet from a connection-based payload packet;

transferring payload data packets as connection-based data packet traffic wherein the adaptive header identifies a connection through which the payload data packets are transferred;

managing connectionless payload data packet traffic to ensure committed quality of service wherein the adaptive header identifies a quality of service associated with each connectionless payload data packet and the quality of service specifies at least an order in which the connectionless data packets are served during transfer through the data network;

establishing any of a path, a connection within a path, or an independent connection using the adaptive header as a control packet; modifying the allocated bit rate of any of a path, a connection within a path, or an independent connection using the adaptive header as a control packet;

and deleting any of a path, a connection within a path, or an independent connection using the adaptive header as a control packet.

2. UTM as claimed in claim 1 wherein the protocol supports both paths and connections for the transfer of payload data packets, and a data packet carries only one field to represent a path, a connection within a path or an independent connection, a differentiation between a path, a connection within a path and an independent connection being made at switch modules in a route from a source to a sink based on information stored in the switch modules at the time the path, the connection within a path or the independent connection is set up using the adaptive header as a control packet.

3. UTM as claimed in claim 1 wherein the adaptive header includes a Quality of Service (QOS) index when the adaptive header is used for connectionless packet transfer to ensure a committed QOS for the connectionless packet.

4. UTM as claimed in claim 3 wherein the QOS index is a 3 bit field that stores an integer selected from a set of 0 through 7.

5. UTM as claimed in claim 1 wherein the adaptive header for a connectionless packet includes a destination field that indicates a destination switch module for the connectionless packet.

6. UTM as claimed in claim 5 wherein the destination field stores a numeric code that identifies a switch module in a Universal Transfer Mode (UTM) network.

7. UTM as claimed in claim 1 wherein an adaptive header used as a control packet to create a path includes the following fields:

a packet type set to indicate a control packet;
a path or connection indicator set to indicate a path;
a create/delete path or connection indicator set to indicate a create function;
a grade of service index;
a new path or connection number field that stores a new path number;
a destination number that indicates a destination switch module for the path; and
a capacity in bits per second of the path to be created.

8. UTM as claimed in claim 1 wherein each switch module traversed by the control packet grants or denies the path depending on the uncommitted capacity of links selected for the path, and the path is established only if all switch modules traversed by the path, including the destination switch module, grant the path.

9. UTM as claimed in claim 1 wherein an adaptive header used as a control packet to create a connection within a path includes the following fields:

a packet type set to indicate a control packet;
a path or connection indicator set to indicate a connection within a path;
a create/delete a path or connection indicator set to indicate a create function;
a new path or connection number field that stores a new connection number; and
a path number to which the connection belongs.

10. UTM for data transfer as claimed in claim 1 wherein an adaptive header used as a control packet to create an independent connection includes the following fields:

a packet type set to indicate a control packet;
a path or connection indicator set to indicate a connection;
a create/delete connection indicator set to indicate a create function;
a grade of service index;
a new connection number field that stores a new connection number;
a destination number that indicates a destination switch module for the connection;
parameters to be used by traversed switch modules, if any, for computing an Equivalent Bit Rate for the connection; and
connection admission control parameters passed to a sink to permit the sink to determine whether the connection can be accepted.

11. UTM for data transfer as claimed in claim 1 wherein an adaptive header used as a control packet to delete a path, a connection within a path or and independent connection includes the following fields:

a packet type set to indicate a control packet;
a path or connection indicator set to indicate a respective one of a path or a connection, as appropriate;
a create/delete path or connection indicator set to indicate a delete function; and
a path or connection number field that stores a number of the path, connection within a path or independent connection to be deleted.

12. UTM for data transfer as claimed in claim 1 wherein an adaptive header used for transferring connectionless payload data packets includes the following fields:

a packet type set to indicate a control packet;
a path or connection indicator set to indicate a connectionless packet;
a grade of service index;
a QOS index set to indicate a quality of service for the packet;
a code representing a destination switch module for the packet;
a field that stores a length in bytes of the entire packet; and
the data to be transferred.

13. UTM for data transfer as claimed in claim 1 wherein an adaptive header used for transferring connection-based payload traffic includes the following fields:

a packet type set to indicate connection-based data packet;
an existing connection number;
a field that stores information related to a composite length in bytes or other data units of the entire packet; and
the data to be transferred.

14. UTM as claimed in claim 13 wherein the information related to a composite length in bytes or other data units of the entire packet is an integer value.

15. UTM for data transfer as claimed in claim 13 wherein the packet is used for transferring multi-type data and the information related to a composite length in bytes or other data units of the entire packet comprises an integer that represents an entire length in bytes of the packet, and at least one other integer that represent a length in bytes of respective portions of the multi-type data.

* * * * *

UNITED STATES PATENT AND TRADEMARK OFFICE
CERTIFICATE OF CORRECTION

PATENT NO. : 7,061,910 B2
APPLICATION NO. : 10/022403
DATED : June 13, 2006
INVENTOR(S) : Beshai M It is certified that error appears in the above-identified patent and that said Letters Patent is hereby corrected as shown below:

At column 1, between line 2 and 3, insert:

This invention was made with Government support under Technology Investment Agreement F30602-98-2-0194 awarded by the U.S. Air Force. The Government has certain rights to this invention.

Signed and Sealed this

Fifteenth Day of August, 2006

JON W. DUDAS
*Director of the United States Patent and Trademark Office*